United States Patent [19]
Brett

[11] Patent Number: 6,026,179
[45] Date of Patent: *Feb. 15, 2000

[54] DIGITAL VIDEO PROCESSING

[75] Inventor: Steven Brett, Sutton-at-Home, United Kingdom

[73] Assignee: Pandora International Ltd., Kent, United Kingdom

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/640,886

[22] PCT Filed: Oct. 28, 1994

[86] PCT No.: PCT/GB94/02375

§ 371 Date: Jul. 1, 1996

§ 102(e) Date: Jul. 1, 1996

[87] PCT Pub. No.: WO95/12289

PCT Pub. Date: May 4, 1995

[30] Foreign Application Priority Data

Oct. 28, 1993 [GB] United Kingdom .................. 9322260

[51] Int. Cl.[7] ...................................... G06K 9/00
[52] U.S. Cl. ............................ 382/162; 348/649
[58] Field of Search .................... 382/162, 164, 382/165, 166, 167, 236, 274, 275, 170; 348/577, 579, 576, 578, 588, 587, 892; 358/518, 520, 515

[56] References Cited

U.S. PATENT DOCUMENTS

| | | | |
|---|---|---|---|
| 4,642,682 | 2/1987 | Orsburn et al. | 358/520 |
| 4,782,384 | 11/1988 | Tucker et al. | 348/577 |
| 5,051,928 | 9/1991 | Gruters | 359/131 |
| 5,255,083 | 10/1993 | Capitant et al. | 348/527 |
| 5,305,094 | 4/1994 | Belmares-Sarabis et al. | 348/651 |
| 5,313,275 | 5/1994 | Daly et al. | 348/592 |
| 5,450,500 | 9/1995 | Brett | 382/274 |

FOREIGN PATENT DOCUMENTS

| | | |
|---|---|---|
| 0 270 350 A2 | 6/1988 | European Pat. Off. . |
| 0 475 648 A1 | 3/1992 | European Pat. Off. . |
| 2 191 904 | 12/1987 | United Kingdom . |

*Primary Examiner*—Amelia Au
*Assistant Examiner*—Samir Ahmed

[57] ABSTRACT

A method of digitally processing a sequence of video frames wherein in object which appears in the frames and undergoes relative motion or transformation is selected in a first frame by an operator; the pixels relating to the object are tagged in that frame by means of information including at least one color or appearance attribute; corresponding pixels relating to the object are located automatically in subsequent frames, by means of said information including at least one color or appearance attribute and by means of information indicating the expected position or shape of the object in the subsequent frames; and the pixels relating to the object in each of the frames are procesed.

6 Claims, 17 Drawing Sheets

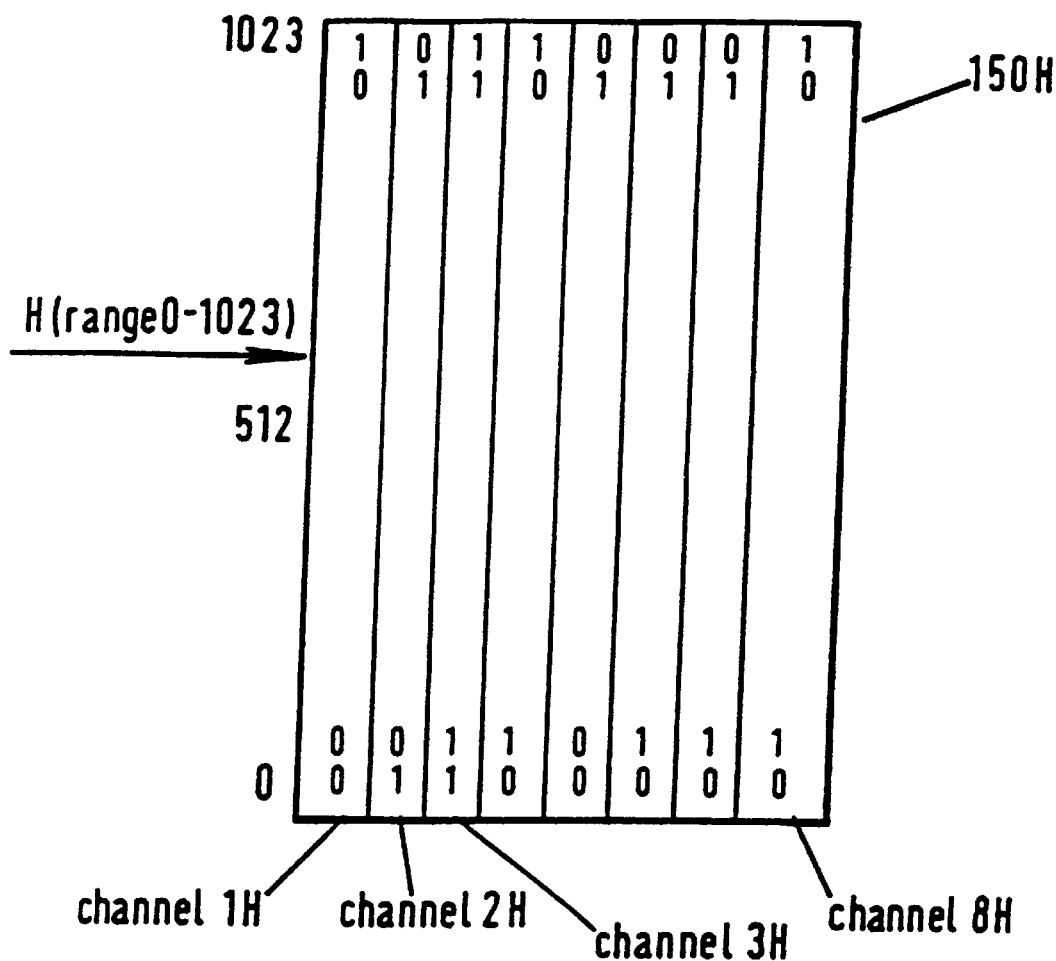

CHANNEL PRIORITY LOGIC

HDCP CARD RACK DETAILS

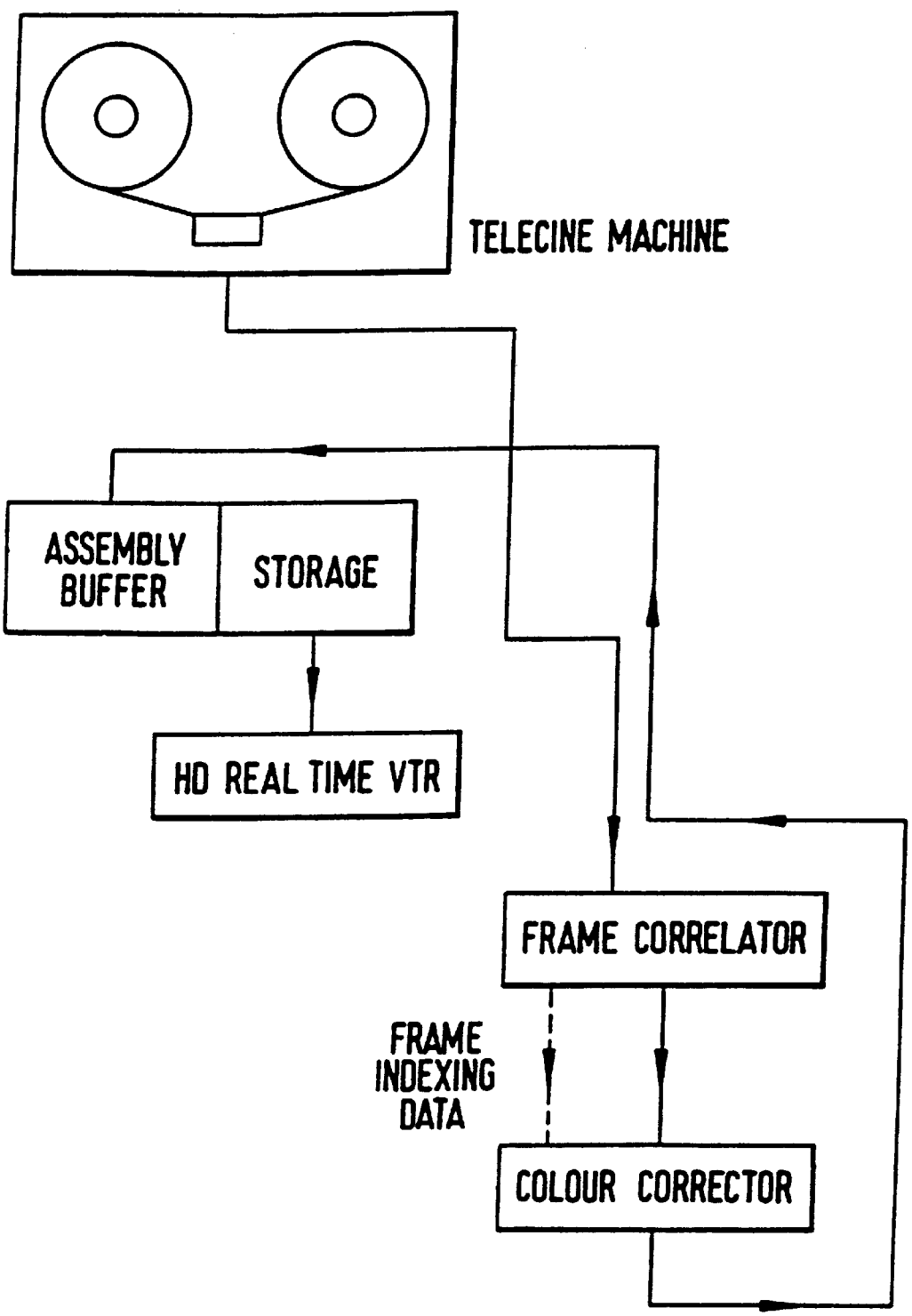

DIGITAL VIDEO PROCESSING

BACKGROUND OF THE INVENTION

1. Field of the Invention

The present invention relates to digital video processing.

2. Description of the Related Art

In U.S. Pat. No. 5,450,500 and UK Patent Application 9407155.2 there is disclosed a digital colour processor (DCP) for colour correction in which only pixels that are specifically selected to be modified are processed by the digital circuitry. The pixels that are not to be modified are passed through the DCP without any processing that could create rounding or other errors. The processor comprises:

input means for receiving a stream of digital pixel data representative of pixels in a video picture;

selecting means for testing digital pixel data in said stream and selecting said data for modification if and only if it meets predetermined selection criteria;

modifying means for modifying said selected pixel data according to predetermined modification parameters to generate modified data;

first combining means for combining said modified data from said modifying means with unmodified data from said input means to generate output data; and output means for supplying said output data to further equipment.

In contrast, in a conventional architecture, all of the pixels in the picture would be processed through the same signal modification path, possibly being converted from red, green and blue (RGB) to hue, saturation and luminance (HSL), and then back again to RGB, causing errors.

An advantage of the above system is that pixels to be modified can be selected not just in accordance with colour parameters but in accordance with other parameters such as position. Thus, only pixels within a certain area might be modified.

Pixel selection advantageously is carried out by using the architecture referred to below as the "pixel identification table" or alternatively as the "cache tag RAM". The pixel identification table stores digital bits which define which pixels will be selected from the pixel stream for modification. Pixels may be selected as a function of their color (hue) as in prior systems, and/or as a function of other criteria, such as saturation, luminance, (X,Y) pixel coordinates, sharpness, and texture, alone or in any combination.

Further, after a pixel or region to be changed has been isolated, other parameters besides (H,S,L) color attributes can be changed. For example, the sharpness or even the (X,Y) coordinates of a region can be changed. Modifying the (x,y) coordinates of a region would be useful, for example, for special effects such as moving an object in the picture. Detecting pixels according to their (X,Y) coordinates could also be useful for copying pixels at a given x,y from one frame to another for scratch concealment. The latter process might be carried out simply by, for the given X,Y, controlling the frame store of the DCP (discussed below), so that those specific pixels are not overwritten from frame to frame.

SUMMARY OF THE INVENTION

It has now been determined that it is possible to use such a system for more advanced handling of objects. Thus, it is possible to identify an object and to track it as it moves from frame to frame. It is also possible to store information relating to the object so that manipulations other than colour correction can be carried out.

According to one inventive aspect disclosed herein there is provided a method of digitally processing a sequence of video frames wherein an object which appears in the frames and undergoes relative motion or transformation is selected in a first frame by an operator; the pixels relating to the object are tagged in that frame by means of information including at least one colour or appearance attribute; corresponding pixels relating to the object are located automatically in subsequent frames, by means of said information including at least one colour or appearance attribute and by means of information indicating the expected position or shape of the object in the subsequent frames; and the pixels relating to the object in each of the frames are processed.

An appearance attribute could include texture or sharpness. A transformation could be in the form of morphing or the like or could be simply rotation.

Processing of the pixels could consist of colour correction, or could consist of storing information about the object so that it could be copied to another sequence, or modified in size, or replaced by a different object.

The information indicating the expected position of the object in each frame could be derived in various ways including edge detection or another motion vector detection system. In a simple system an operator could draw e.g. a rectangle around the object in the first frame and a second rectangle around the object at a different position in the last frame. The system would then calculate by extrapolation the expected position of the rectangle in the intermediate frame, assuming constant speed of movement. By positioning the rectangle manually in a few intermediate frames more accurate results could be obtained or changing speed or direction detected and accounted for.

It may be desired to identify more accurately the boundary of an object and according to another inventive aspect disclosed herein, there is provided a method of identifying the picture elements within a particular object, comprising the steps of marking a plurality of points on the boundary of the object, defining vectors joining the points so as to define the boundary of the object, carrying out a scanning operation so as to identify the pixels within the area, and storing the locations of the pixels.

Additionally, account may be taken of a change in shape, for example as a car turns a corner. Starting and finishing shapes may be defined, and the system will estimate intermediate shapes.

Providing all the pixels within the originally defined object are selected in accordance with the selected colour parameters, by selecting in subsequent frames only pixels which have those parameters and are within the defined boundarys, the system can exhibit considerable selectivity. For example, a slight turning of the object might require the boundaries to be narrowed slightly, but even if this is not done, it will be accounted for since the object colours will remain the same and only pixels with those colour parameters will be selected. Pixels within the defined boundary which do not belong to the object colour parameters will not be selected.

Another inventive aspect disclosed herein relates to an efficient system for storing the properties of pixels or for storing the required criteria for pixels to be selected. In this system, at least two tables are established, each table having a plurality of locations representing respective possible values of a property of a pixel. Appropriate values are stored in each table, and by simple AND logic it is possible to identify the properties of a chose pixel. The tables could respectively contain H,S,L values, x,y co-ordinates and other information as described herein. Such an arrangement permits efficient storage of the information.

In one system, each table contains information relating to a number of pixels and each location can have a plurality of values. Thus it is possible, by using different values and having corresponding values in two or more tables, to tie together the total information relating to a particular pixel.

The system described herein permit sophisticated editing techniques. In particular, object can be tracked and their properties altered, or they can be lifted from a video.

It will be appreciated that protection may be sought for any of the inventive aspects discussed above, whether along or in combination.

BRIEF DESCRIPTION OF THE DRAWINGS

Some embodiments of the inventions disclosed herein will now be described by way of example and with reference to the accompanying drawings, in which:

FIG. 6 is a schematic illustration of a cache tag RAM for hue values, showing a RAM divided into eight channels, each channel being arranged for storing data bits corresponding to a respective set or range of hue values.

FIG. 17 is a diagram showing the basic layout of a system enabling a simplified colour corrector to be used.

DESCRIPTION OF THE PREFERRED EMBODIMENTS

I. Introduction

The DCP disclosed herein is an advanced, multi-functional all-digital color corrector as disclosed in U.S. patent application Ser. No. 08/045,560 and UK patent Application 9407155.2. The inputs and outputs of the DCP are preferably 10-bit digital RGB signals, that is, with ten bits used to describe each of the input red, green, and blue signals.

All components are standard. All functions and timing of the disclosed components are controlled by a Motorola 56000 (or 58000) series microprocessor using conventional techniques.

High definition television requires five times the data rate and bandwidth of standard definition television. The data rate of the DCP will match the HDTV1 output from the BTS FLH1000 telecine. By way of two 50-pin D-connectors, the DCP can accept multiplexed Y/cb/cr data in the 4:4:4 format. The word size is 10-bite. The DCP will accommodate a maximum clock rate of 80 MHZ. The following line standards will be supported:

| Lines | Hz | Pixels/Line | Clock (MHz) |
|---|---|---|---|
| 1250 | 50 | 1920 | 72 |
| 1050 | 59.94 | 1920 | 72 |
| 1125 | 60 | 1920 | 74.25 |
| 525 | 59.94 | 720 | 13.5 |
| 625 | 50 | 720 | 13.5 |

Internal calculations will be carried out at 16-bit accuracy, which will prevent rounding errors; the results will be rounded to 10-bits at the final stage of the signal modification path.

Hue can be modified throughout a full 360° range in the cylindrical color space. Saturation and luminance can be varied from 0 to 400%. Hue, saturation and luminance can be selected with 10-bit accuracy.

Preferably, according to a preferred embodiment of the invention, digital video information, for example from the FLH1000 telecine, is decoded and demultiplexed by means of a decoder/demultiplexer such as a standard gate array logic, or an ASIC (element 1 in FIG. 1), or any other conventional circuit which is able to provide a 10-bit Y/Cr/Cb (YUV) data input at up to 74.25 MHz clock rate. This signal is converted by a digital multiplication matrix 2 to provide RGB data. By changing the coefficients within the matrix, master saturation and luminance controls are provided.

Figure 10:
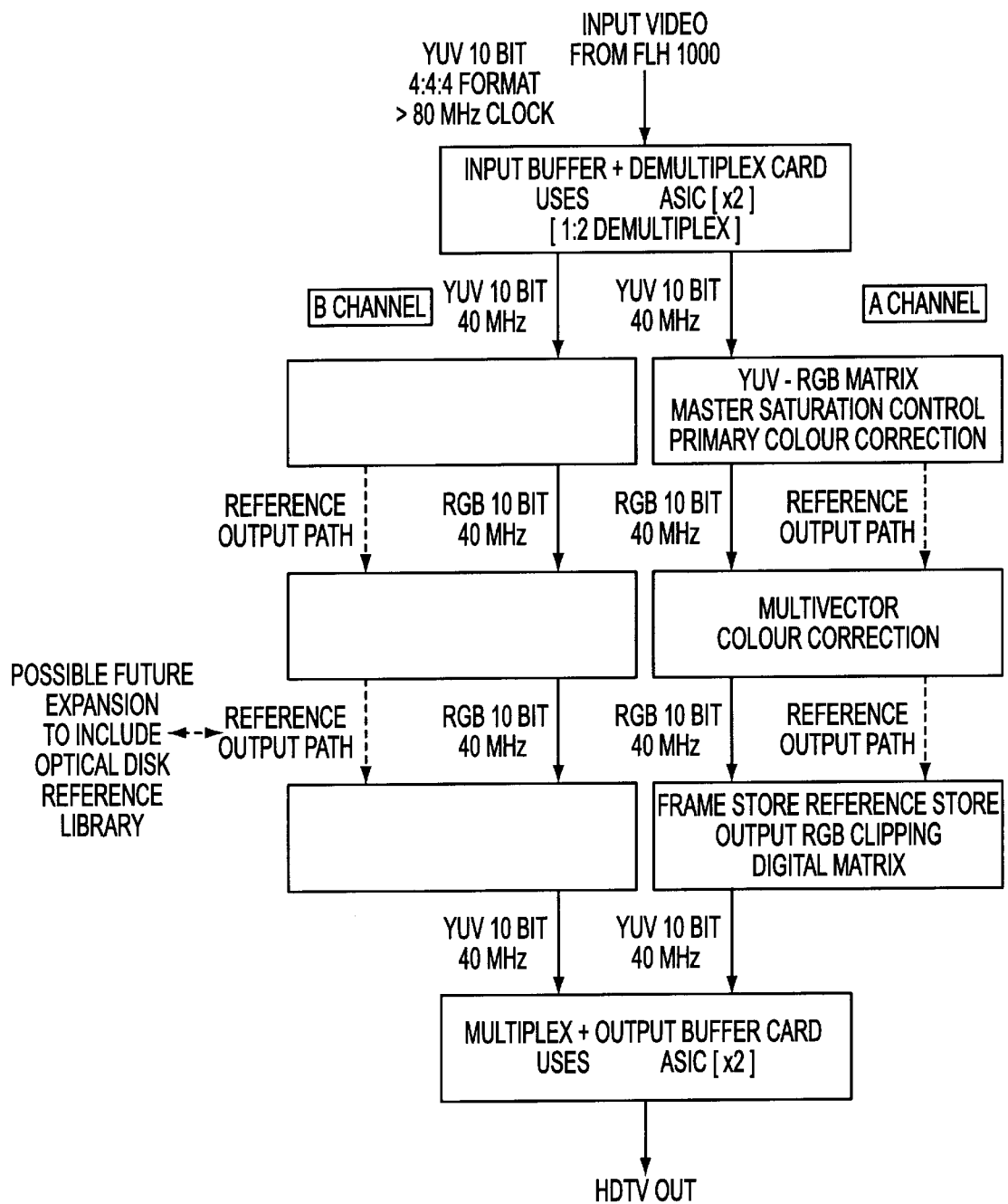
FIG. 10 is a schematic illustration of signal flow among various components of the DCP according to a practical embodiment thereof.
Figure 11:
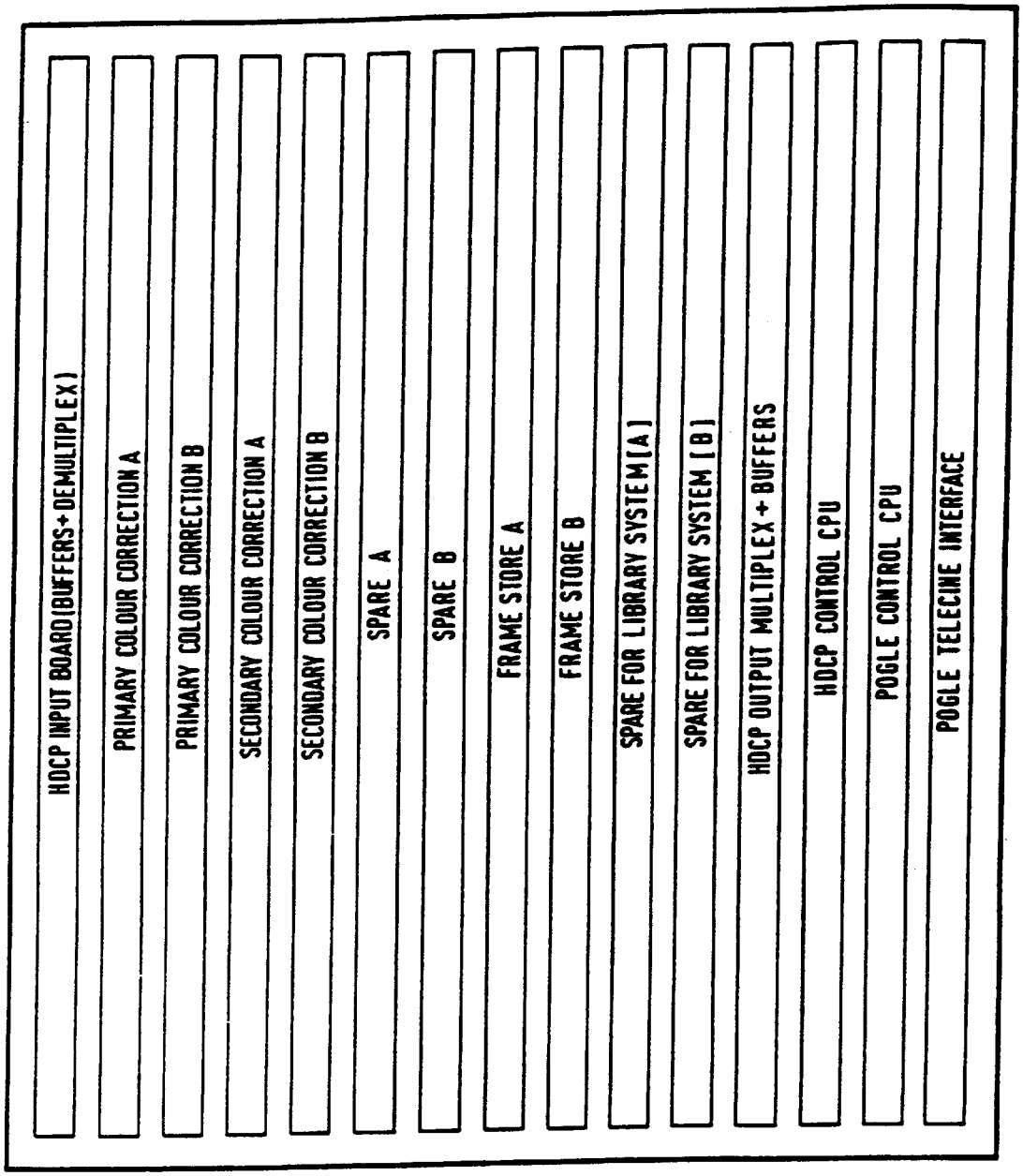
FIG. 11 shows a card rack arrangement in a practical embodiment of the DCP.

Reference is made to FIGS. 10 and 11. Even with the speed of recently available semiconductor devices it is not cost-effective to build signal processing circuitry to cope with up to 80MHz data rates. However, the architecture described herein can easily be broken down into a series of blocks which can operate in parallel to achieve the desired bandwidth.

The device 1 will accept full bandwidth data through the input and output ports of the system. This device, together with ECL buffers, can directly accept signals at clock speeds up to 100MHz and provide parallel (multiplexed) TTL data streams at reduced frequency.

The device 1 outputs 2 multiplexed channels, each at half the input clock rate. In the worst case (1125-line, 50Hz) each channel will operate at 37.125 MHz. Each of the A and B channels will be 30-bit-wide parallel data. If pixels are numbered horizontally across each TV line starting at 00, then channel A will carry evenly numbered pixels while channel B will carry the odd-numbered pixels. Differential ECL drivers will be used to carry this data through the backplane to alternate pairs of identical cards. On each card a further level of multiplexing will provide two sub-channels at ¼ of the input clock rate (i.e., 18.6 MHz maximum) which can then be processed efficiently by the various DCP logic blocks. Each card will therefore carry two identical sets of circuitry together with the necessary MUX/DEMUX logic.

As mentioned above differential ECL drivers and receivers will be used to carry video data through the background. This method has already been proved reliable in commercially released Pandora color correctors, which carry multichannel video data multiplexed at similar speeds. ECL will also be used onboard each card to perform the sub-MUX/DEMUX function.

The main microprocessor control channel which runs through the backplane of the system will use BTL drive logic similar to those devices specified for Futurebus. This is desirable in order to achieve the required speed and fanout. Active bus termination will be employed at each end of the Backplane.

Standard television has 500–600 lines (625 in Europe, 525 in the United States) per frame. High definition television has more than 1,000 lines. Film-grade resolutions are equivalent to many thousands of lines (2,000–8,000 for example). With appropriate downsampling and interpolating as described below, the DCP is capable of operating in the following modes:

(a) standard definition main path, standard definition modification path (i.e., no subsampling or interpolating) in real time;

(b) high definition main path, standard definition modification path (i.e., with subsampling at 3a and interpolating at 5a) in real time;

(c) the use of the system as in (a), without subsampling or interpolation, for non-real time processing of high definition or film resolution video; and (d) high definition main path, high definition modification path, in real time, without subsampling or interpolating.

In all of these cases, the pixel depth, i.e., bits per pixel, is 10 bits (1,024 levels).

"Resolution" refers herein to the spatial resolution between lines, or pixels within a line; while "pixel depth" refers to the number of bits per pixel.

Figure 1A:
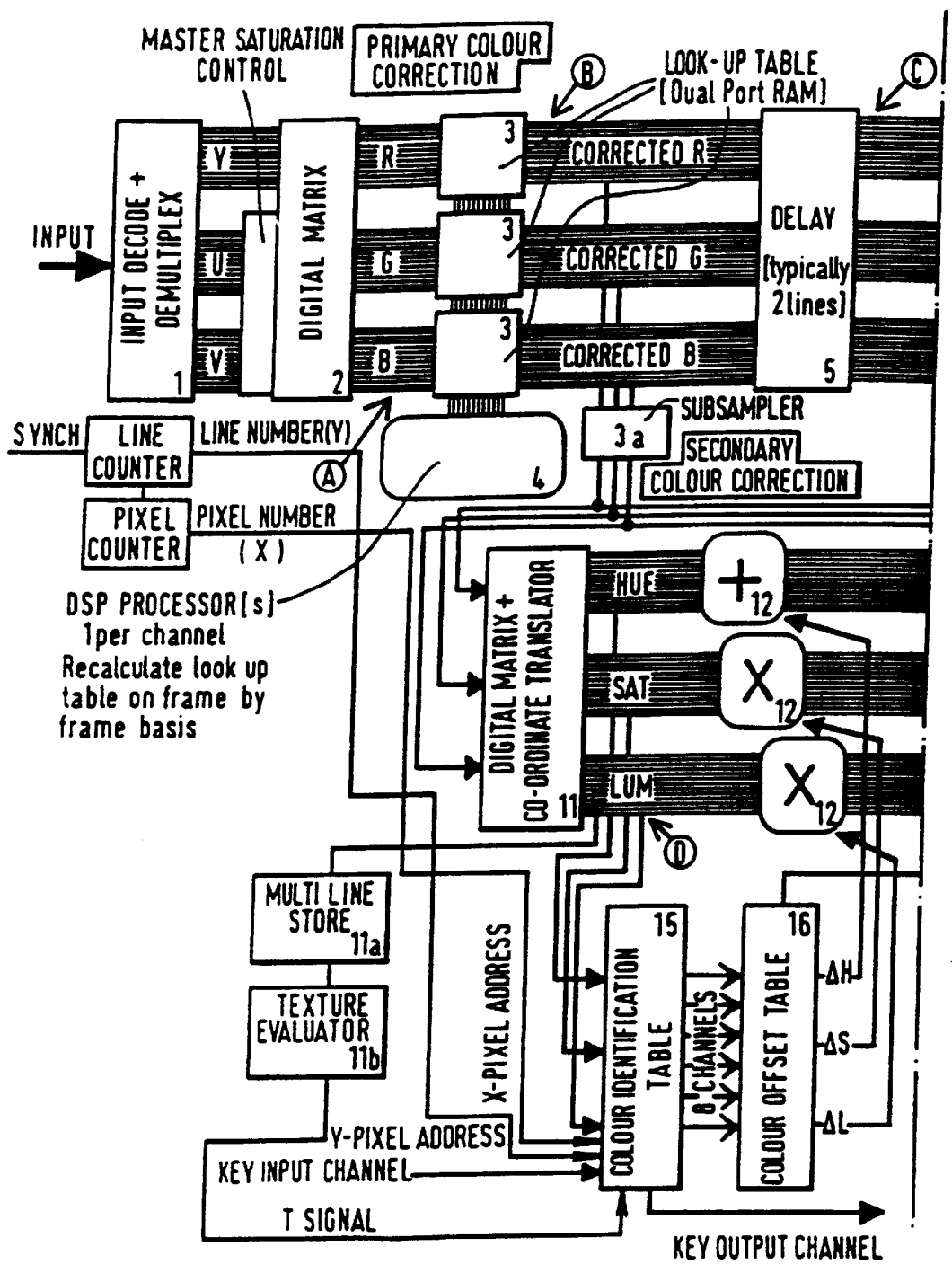
FIG. 1 (in parts A and B) is a block diagram showing a digital color processor (DCP) which can be adapted for use in a preferred embodiment.
Figure 1B:
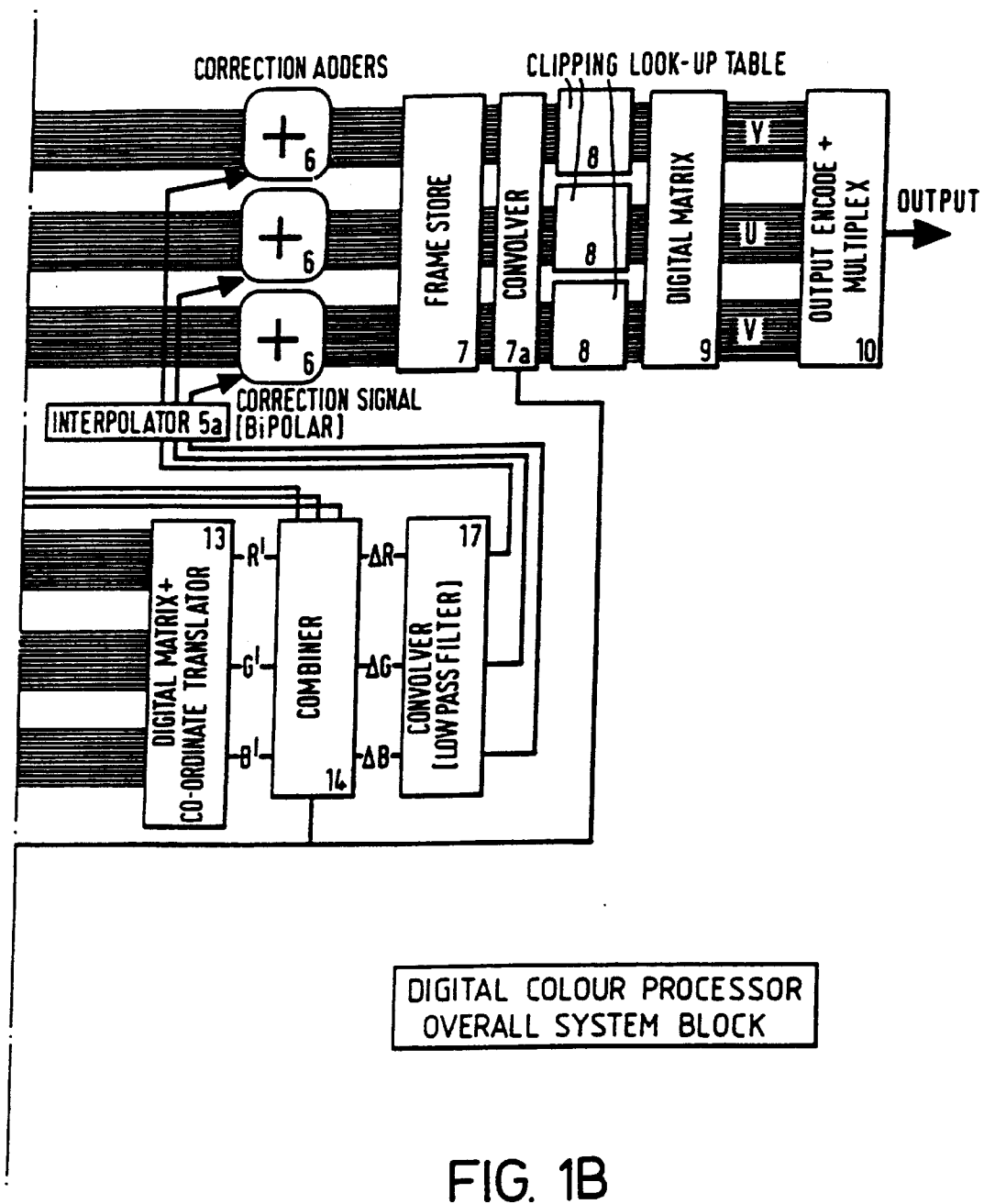

A block diagram of the DCP is shown in FIG. 1. A primary signal processing path transmits the input signals to the outputs. A secondary path forms a bypass off of the primary path, and is used to calculate the modification signals.

II. Primary Signal Path

The primary signal path starts with the inputting of RGB digital signals at an input, which may be respective 10-bit RGB output signals from a telecine, a VTR, or any other digital video signal.

The R,G,B digital signals may be supplied by a conventional input arrangement as shown in FIG. 1, which comprises an input decode and demultiplex unit 1, which receives RGB signals and outputs Y, U and V signals; an intermediate master saturation control which processes the U and V signals from the unit 1; and a digital matrix 2, the latter outputting the 10-bit R, G and B signals.

Figures 3, 4:
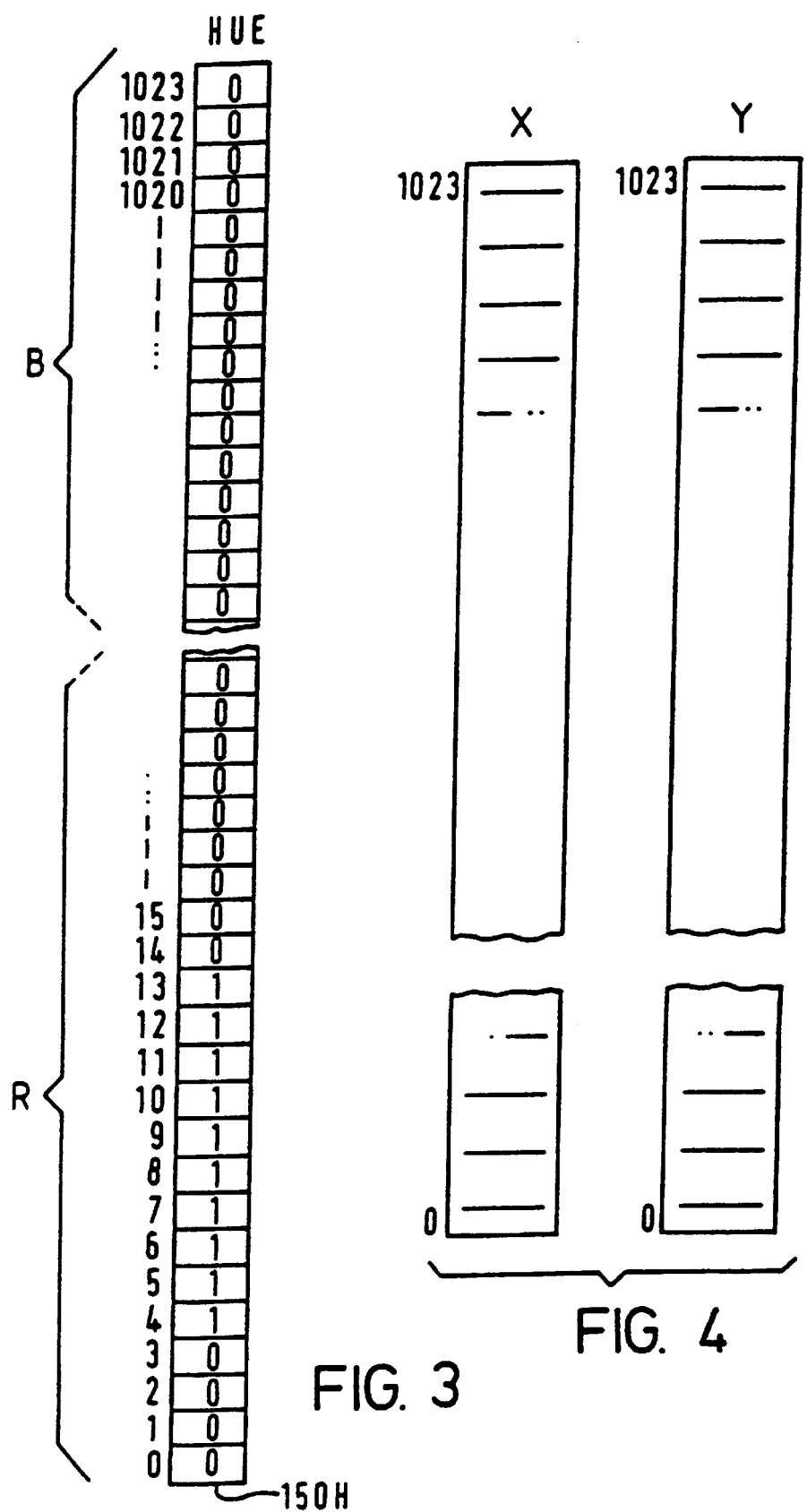
FIG. 3 schematically shows the arrangement of a cache tag RAM for hue in the pixel identification table of FIG. 2.
FIG. 4 schematically shows the arrangement of cache tag RAMs for X and Y coordinates in the pixel identification table in FIG. 2.

For pixels that are not intended to be modified, a completely transparent R,G,B signal path is provided from point B (or point A if the LUT's 3 are not set to modify the video signal) through the output of the convolver 7a (and further, through the LUT's 8 for legal video signals). For use with the RGB output from the Rank Cintel 4:4:4 URSA store, conversion between RGB and YUV is completely unnecessary. In any event, the conversion between YUV and RGB and vice versa at stages 1, 2, 9 and 10 in FIG. 4 is essentially reversible and does not introduce errors in the normal case.

The R, G and B signals are then provided to respective primary lookup tables 3 (LUT's). These can be used, if desired, to perform the same functions as the conventional gain (white level), lift (black level), and gamma (contrast and midtone) controls of the telecine. They can also modify color. The primary lookup tables can modify all of the pixels in the entire picture. They can be used to perform "master" modifications (that is, modifications applied equally to the red, green, and blue channels resulting in a tonal change, but not a color change), by applying an identical modification to the red, green, and blue lookup tables. "Differential" modifications are accomplished by applying modifications to only one or two of the lookup tables. In this way it is possible to modify, for example, the gamma of blue only.

The primary LUT's 3 are preferably dual-ported RAM's, so that they can be loaded via one port, while the main signal processing function continues via the other port. Thus the LUT's 3 are capable of being reloaded between frames, which is known to those in this art as "dithering." Applying different LUT's to successive frames is useful for temporally breaking up grain and noise, for example.

One reason for replicating the functionality of the telecine controls with the primary lookup tables 3 is to be able to custom-load these tables and thereby accomplish a degree of control not available on the conventional telecine.

The primary lookup tables 3 are not essential to this invention, but are primarily a convenience for use in tape-to-tape transfers. They also may be used to control the response curves of the DCP in order to, for example, emulate a particular telecine. They are loaded by the DSP 4, which is controlled by a programmer/controller such as the POGLE controller described above.

The DSP (digital signal processor) 4 is a microprocessor of any conventional design which is capable of implementing an algorithm for producing a family of curves, dependent on the parameters of the algorithm. For example, a family of different parabolic curves can be generated by calculating in the DSP 4 the value of the output of the algorithm on a step-by-step basis for each step of the lookup table. For example, if the DSP is programmed with the equation of a straight line, a straight line is loaded into the lookup tables 3.

The lookup tables 3 are constructed by using RAM memory which is addressed by the input video signal. When the system is first powered up, the processor 4 associated with each lookup table writes an incrementing series of values at each address in the RAM. In other words, initially, the contents at a given address equals that address. Thus, when the video signal is applied to the address input of the RAM, the data output provides exactly the same hexadecimal value and so the video signal passing through the RAM remains unchanged.

However, at any time, the DSP 4 may calculate a different series of values to be written into the RAM for providing a translation of the video signal. By this means it is possible to transform any red value in an input signal, for example, into any other red output value.

At point B, after processing by the primary lookup tables 3, all of the corrected R, G and B signals, including those that are not to be modified, are provided (possibly downsampled) to the secondary signal path.

If the primary signal path is high definition (HD) then it is advantageous for the modification path to be standard definition. Therefore, the HD image is subsampled down at point B and is interpolated up at point C. A subsampler 3a and an interpolator 5a are shown in FIG. 4. According to one simple subsampling technique, it is possible to simply pick every other pixel and every other line in the subsampling process, and then to replicate each pixel and each line in the interpolating process. Also useable are more complex techniques such as bilinear sampling and interpolation (that is, linear interpolation in both the along-line and between-line directions); and even more complicated interpolators such as the Cubic-B spline technique. See, Pratt at pages 113–116, incorporated by reference.

According to one example of a technique of bilinear sampling and interpolation, the subsampler 3a could interpolate down, for example, by averaging 2×2 arrays of pixels in a high definition 1,000-line picture and converting those four pixels to one standard-definition pixel, that is, a fourfold data reduction. The resulting data rate will be ¼ of the high definition rate, that is, approximately the standard definition rate. Correspondingly, after processing by the signal modification path, the interpolator 5a would interpolate up by, for example, bilinear interpolation between adjacent ones (in both the X and Y directions) of the standard-definition pixels that have been processed in the signal modification path.

Next along the primary signal path is a digital delay 5, which may comprise one or more delay lines. In the disclosed embodiment, the delay 5 provides a time delay of two lines (2L). This delay gives enough time for the secondary signal path to calculate the modification signals, which will be used to modify the original signals.

After the delay 5, the modification signals are brought back into the main signal path at point C, and combined, for example by interpolation (upsampling) by an interpolator 5a, with the unmodified main signals by correction adders 6. The output signals from the adders 6 then form the 10-bit red, green, and blue modified digital outputs which are then filtered by the convolver 7a and subsequently outputted from the DCP.

Element 7 is a buffer frame store, which provides resynchronization of the video signal after processing. Video delay through the system is thereby arranged to be one TV frame. H and V output timing adjustments (not shown) are also provided.

The logic used to provide both primary and secondary color correction is pipelined for reasons of speed. This means that the signal at the output of the adders 6 is delayed in time relative to the input. In a studio environment this time delay would have disastrous consequences and so the frame store 7 is used to re-syncronise the video output.

This frame store 7 is constructed using RAM configured as a FIFO memory, whereby data is written in using the input clock which has been passed through the pipelined stages discussed above. Some time later a regenerated clock locked to station reference is used to read out the data in a similar order, but in synchronisation with system line and field timing.

A second frame store (not shown) is provided in parallel with the above to allow the operator to store a single frame of video for color matching. The input to this second frame store is switchable from various stages throughout the processing circuitry, allowing the colorist to compare between a corrected and uncorrected image. The output of the second frame store may be overlaid on the main video output by means of a WIPE control.

Convolver 7a receives the output of the frame store 7 and smooths it according to a known convolution scheme which is discussed below in connection with the convolver 17.

The convolver 7a output is passed to a lookup table 8 which is used to perform a clipping function on the RGB signal in order to ensure that improper or illegal values are not passed to the output. The lookup table may be updated at any time by a microprocessor (not shown), allowing different algorithms for clipping to be selected.

Element 8 is a clipping lookup table, which clips signals at their maximum or minimum values to prevent "rollaround", i.e. to keep the output within the 0–255 (8-bit) range. In addition, it is normally necessary to restrict the output to the 12–240 range, as required by the SMPTE standard for digital video, the reserved areas above and below this range being used for blanking and special effects. The LUT's 8 may be reconfigured under software control (not shown) to select either "hard-" or "soft-edged" clipping algorithms.

Finally the RGB signal is re-converted to YUV color space before being passed to the output multiplexer and the line driver stage. Use may be made once more of the above-discussed decoder/demultiplexer (in reverse) or an equivalent device to reconstruct the output signal in a similar format to that originally derived from the FLH1000 or other telecine.

Element 9 is a matrix which converts, if necessary, from the RGB environment to a YUV (luminance-chrominance) environment. Finally, in the output encoder and multiplexer 10 the YUV signals are conventionally encoded and multiplexed for, e.g., broadcasting or recording.

III. Secondary (Modification) Signal Path

In the secondary signal path, the DCP produces respective modification signals for those pixels, and only for those pixels, which have the criteria indicating that they are to be modified.

A. Signal Conversion to (H,S,L)

The first step in the modification signal path is a digital matrix and coordinate translator unit 11 which converts the red, green, and blue signals into signals representing hue, saturation, and luminance. There are several commercial chips which can perform this function by use of public-domain algorithms. In this case, the matrix first provides conversion from (R,G,B) to (Y,U,V). The Y signal becomes the final L signal. The coordinate translator converts from Cartesian coordinates (U,V) to cylindrical polar coordinates (H,S), by means of a lookup table in PROM.

Transformation from R,G,B signals into cylindrical color space (H,S,L) is described, for example, in R.W.G. Hunt, *The Reproduction of Color in Photography, Printing, and Television* (Fountain Press, Tolworth, England, 4th ed. 1987), ISBN 0-85242-356-X, at 114–121, incorporated by reference. In cylindrical color space, luminance is conventionally shown as a vertical axis. Planes which intersect this axis at right angles are planes of constant luminance. Planes of constant hue extend radially out from the axis, each having a hue angle. Saturation or amount of color is represented by the distance from the axis; thus, at the luminance axis there is no color.

One possible hardware implementation, incorporated by reference herein, utilizes first the TRW model TMC2272 chip, which transforms the incoming RGB to YUV, which is a color space comprising luminance (Y) and two mutually orthogonal chrominance vectors U and V. The second stage is the TRW model TMC2330 chip, which mathematically transforms from rectangular (Y,U,V) to polar coordinates (H,S,L). Both of these chips are also usable in the reverse direction for conversion from HSL to YUV to RGB.

H,S,L color space is conceptually convenient to use in practice. In contrast, the U and V vectors are difficult to imagine. The conversion from YUV to RGB to HSL is in two stages for convenience, as standard chips are readily available to do these two conversions, while no standard chip is readily available for converting directly from YUV to HSL. On the other hand, three-dimensional RGB color space is essentially cubical and therefore, it is advantageous to carry out the clipping functions by the LUT's 8 (and also the master transformations by the LUT's 3) in RGB space.

B. Pixel identification Table

Following the conversion to H, S, and L, selected boundary conditions in this color space are inputted under operator control into a pixel identification table 15, which distinguishes the region of color space to be modified, from the region not to be modified. This technique will be referred to herein as "cache tagging". It involves defining a range of data bounded by particular data values. These ranges are "tagged" in a "cache tag RAM" (described below) for later use. As shown in FIG. 1, X, Y and T tags may be employed. At least H, S and L "tags" are employed in the preferred embodiment.

For each pixel, it is determined whether to "modify" or "not modify" that pixel by taking the logical AND of the output bits from the H,S,L, etc., cache tag RAMs, which are located with the predetermined criteria for selecting which pixels in the input signal are to be modified. If all of the output bits are "1", that will indicate that for that pixel, a modification signal will be generated, which will be added back into the main signal path later on.

As an example of this process, the DCP is capable of tagging only very narrow range of reds, which might be useful, for example, to improve the color of one piece of red clothing. All other "reds", and other colors including black, white and grey, remain untouched. By the same process, all of the colors in a multicolored piece of clothing can be selected simultaneously.

Advantageously, there is also a "master hue" or "wash" mode, wherein all of the pixels in the picture are marked to be changed, and then the hues or other attributes of all the pixels can be changed simultaneously.

"X" and "Y" tags can also be used in the cache tag RAMs, in order to represent the boundaries spatially (where X and Y are pixel and line addresses). X and Y tags can be inputted, as shown in FIG. 1, by direct entry of X and Y addresses into the pixel identification table 15.

X and Y coordinates of a particular pixel are determined from the studio synch signal as seen at the left-hand portion of FIG. 1. Lines are counted by a line counter and pixels within each line are counted by a pixel counter. The line counter and pixel counter have outputs corresponding respectively to the Y and X coordinates of each pixel. The synch signal contains a frame reset signal which corresponds to X=0, Y=0 followed by a series of pulses for incrementing X, followed by a line reset signal (which resets X to 0 and increments the line number Y). The X and Y signals are made available to the pixel identification table 15. The availability of the X and Y coordinates of each pixel enables processing of each pixel "on the fly" in a very simple manner.

Alternatively, a conventional key input channel to the pixel identification table 15 is essentially a substitute for the cache tag RAM. (It could also be used in tandem with the X and Y tag RAM.) A conventional key input signal can be applied to the key input channel and ANDed with the H, S and L table outputs to control directly when the offsets from the offset table 16 are to be applied to a given pixel. As is conventional, the DCP and the source of the key input signal are coordinated by the common sync signal to which all of the studio equipment is normally connected. The key signal, again as is conventional, is a black-on-white or white-on-black picture signal (which may be rectangular or have any other shape) which can be used to control further equipment such as the offset table 16. A key input signal can be generated by a vision mixer such as the Abekas A84 and many other devices.

Also as seen in FIG. 1, the pixel identification table 15 can be employed to indicate selected pixels by means of a conventional key output signal on a key output channel, for controlling further equipment, rather than to select offsets from the offset table 15.

Figure 2:
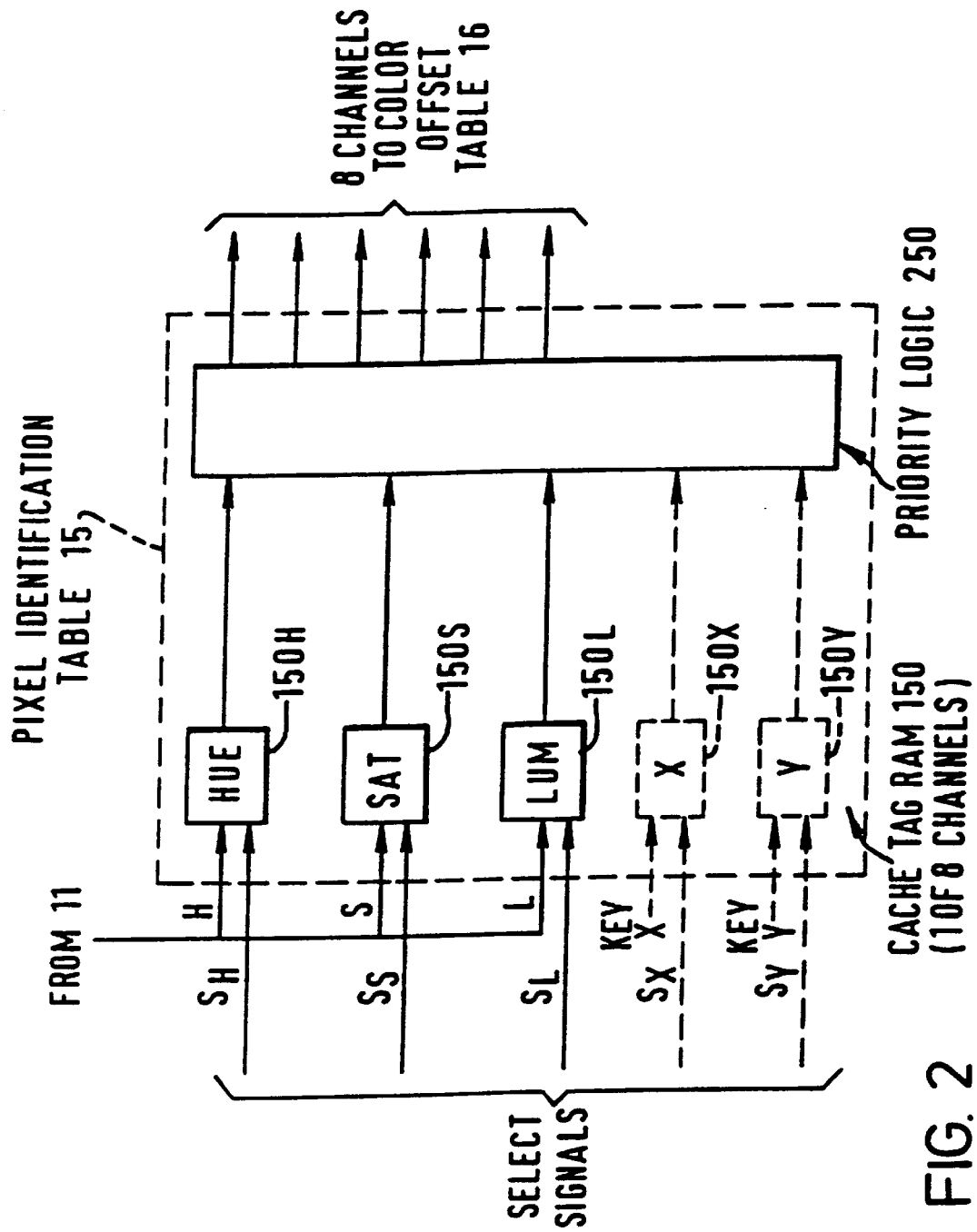
FIG. 2 is a block diagram showing the pixel identification table of the DCP.

FIGS. 2 and 3 show the structure of the pixel identification table 15 in more detail. It comprises a cache tag RAM (or CTR) 150, which in this embodiment comprises at least hue, saturation, and luminance RAMs 150H, 150S and 150L, respectively. These may be supplemented by X and Y RAMs 150X, 150Y. Hue, saturation, and luminance components of each pixel are supplied by the digital matrix and coordinate translator 11 at point D as described above. Select signals SH, SS and SL are provided by the control panel or by a controller such as the POGLE controller and provide data to be entered into the RAMs 150H, 150S and 150L respectively, to indicate how pixels are to be selected for modification according to their hue, saturation and luminance (and optionally SX and SY signals, and/or other signals representing sharpness, texture, or another parameter). The entered selection criteria distinguish the regions to be modified from the regions not to be modified, and to generate control signals according to predetermined standards to control the DCP. The RAMs 150H, etc., will be described further below in more detail.

By means of a cursor, the operator of the DCP can point on a screen to a particular color, or to a physical region containing one or many colors. The programmer/controller will then provide (H,S,L) data and optionally (X,Y) or other data to the pixel identification table.

There are a plurality of channels (for example, 8 channels) each having a set of cache tag RAMs 150 which can thereby specify 8 modification sets. For example, 8 objects in a picture can be modified if they can be specified uniquely by a combination of H, S and L data, optionally supplemented by X and Y data, for example. The RAMs 150H, 150S and 150L are each 1K RAMs, i.e., RAMs having 1,024 address locations corresponding to a 10-bit input address. The CTR's can be implemented by standard components or by an application-specific integrated circuit (ASIC). By means of such RAMs, 1,024 individual degrees of hue, saturation and luminance can be defined. Thus, 3K bits can control $2^{30}$ (or 1,073,741,824) possible colors. Great color resolution can be controlled by means of a minimal amount of data.

FIG. 3 is a schematic diagram indicating a possible implementation of the hue CTR 150H. As an example, the bottom third of the addresses in RAM 150H could be designated to correspond to respective shades of red. The middle third could correspond to shades of green, and the top third of the addresses in RAM 150H could be designated to correspond to shades of blue. These designation are indicated by the letters B and R on the left side of FIG. 3. As seen therein, bits 4–13 are loaded with the value "1" and the rest of the bits are loaded with "0." Thus, a narrow range of shades of red that have been defined to correspond to bits 4–13 are being selected for modification. Every pixel is applied as an address to the hue CTR 150H in the pixel identification table 15. If a pixel's hue is binary 4 to 13 the output of the CTR 150 H will be 1, indicating that that pixel has a hue in that range of red shades. Those pixels will be modified according to a predetermined modification stored for that channel in the offset table 16.

If, in the preceding example, a pixel with that specific shade of red is to be selected regardless of its saturation and luminance, then the S and L RAM's 150S and 150L are loaded completely with 1's.

The H, S, and L table contents for a particular pixel are ANDed to determine whether that pixel will be selected for modification. For example, all pixels of a given hue, irrespective of the S and L, can be selected by loading selected locations in the H table with ones, and all of the S locations and all of the L locations with ones. Or, only certain combinations of H, S and L can be selected by only filling portions of each table, which need not be continuous, with ones. The cache tag RAM signals are ANDed, and therefore, only if all of the criteria (H, S, L, X, Y, and any other criteria being used) are met, will that pixel be tagged for alteration.

Advantageously, there will be a macro feature on the controller to carry out any routine series of loading functions, such as, for example, setting up the DCP to select pixels of given hues, automatically loading all of the S and L locations with ones in order to disregard saturation and luminance.

In practice, it has been found advantageous for there to be default settings for the H, S and L tables. By default, all luminance values are selected by filling all locations in the L table with ones. Channels 1–6 are each loaded with ⅙ of the hue range. The top 95% of the saturation range is loaded with ones, in order to select substantially all colors, but not neutrals (which have zero saturation).

FIG. 4 shows a possible implementation of CTRs 150X and 150Y, which again are 1K RAMs. These two RAMs can be used to designate individual pixels, or rectangular regions that occur at intersections of X and Y ranges. The Y and X locations correspond respectively to lines and locations within lines in the picture. Controlling spatial regions of a picture for modification with 1K RAMs for the X and Y coordinates is not as powerful a technique as using a 2-dimensional address memory, for example, but it is almost as useful and is still very powerful because again, with only 2K bits of data, one million distinct pixel locations can be designated. Thus, by this technique, the DCP can delineate, for example, a rectangular region of the picture to be modified (or not modified).

As an example of cache tagging, let us consider the example where we wish to modify all pixels in the picture with a "mid-range" value of luminance. In this example, the control panel will interpret its settings as an instruction to change pixels which have any value of hue, and any value of saturation, but a luminance value greater than a lower threshold L1, and less than an upper threshold L2. This will cause the luminance tag RAM to be loaded with zeroes for the possible 10-bit values from 0 to L1. For example, if L1 is 256 (one-quarter range) and L2 is 768 (three-quarters range) then the first 256 values of the L cache RAM will be loaded with zeroes ("do not modify"). The addresses 257 to 767 will all be loaded with the value "1" ("modify"). The remainder of the cache tag RAM addresses (addressed 0 to 256 and 768 to 1023) will be loaded with zero ("do not modify").

It can be seen from this simple example that we can distinguish by this technique between any region in color space and any other region. Even if two regions have the same hue, they can be distinguished on the basis of luminance or saturation. In accordance with one of the inventive aspects disclosed herein, for more complex cases, one can distinguish by logical combinations of H, S, and L limits and X and Y addresses. Note that a range of a single parameter or a region of colors need not be contiguous. Thus, if 157 non-consecutive values of hue were to be modified, at those 157 hue-valued addresses in the hue cache tag RAM, there would be a "1". This demonstrates the enormous resolving power of the cache tag system.

As mentioned above, the architecture of the DCP provides for a plurality of independent channels. For example, 6, 8 or 10 channels may be sufficient for most purposes. FIG. 6 schematically shows 8 channels. Thus there can be eight "channels" with respective pixel identification tables 15, which are able to modify eight separately defined regions, colors, luminance ranges, etc. These regions can overlap.

In practice, all 8 channels of hue, for example, can be implemented with one 8K hue RAM. The hue RAM has 8 bits of data at each address, each bit corresponding to one hue address for one of the 8 modification channels.

The Hue CTR is structured in bytes as is normal for memories. Each bit of the 8-bit byte corresponds to one channel and represents either "select" or "not select" the particular hue which corresponds to that byte for that particular channel.

FIG. 6 shows the hue CTR in greater detail. FIG. 6 shows an 8K RAM where 8 channels (1H–8H) have been designated having 1K (1024) bits each. This will be presumed to be the H CTR, the S and L CTR's being identical. A given 10-bit H value of an input pixel is inputted to the CTR 150 H and is used as an address for addressing all 8 of the channels. If, for channel 1, the H, S and L CTR's all have 1 at a particular address corresponding to the input pixel's H, S and L value, then that pixel is said to have been "tagged" for alteration. Then, for that channel, the ΔH, ΔS and ΔL which have been preloaded, will be supplied from the offset table 16.

C. Priority Logic

The DCP pixel identification table 15 contains precedence logic 250 to resolve internal conflicts between channels about color modification. Many such conflicts will be avoided by the use of X and Y cache tag RAMs to specify a specific physical object whose color is to be modified, but even then, a conflict will occur when moving objects find themselves temporarily in the same X,Y region. To implement the priority logic, highest priority may be given to lower-numbered channels, and lower priority to higher-numbered channels. This is not a restriction on operational flexibility, as channels can be renumbered at will.

As an example, it might be desired to modify a particular red shade when it occurs in a traffic signal in a given scene, but not when it occurs in the clothing of a person walking near that traffic signal. The solution would be to give priority to a channel which specifies both clothing color and location, so that the red shade will not be modified unless it is at the proper location.

As another example, if it were required to make an image go monochrome, except for the reds in the picture, one channel of the DCP could be used to make all of the picture monochrome. Then, a second channel would be selected to identify reds, to prevent them from going monochrome. The second channel would be designated to have priority over the first channel.

Channel 1 is always the highest priority channel. An input pixel, for example, is applied first to channel 1. However, a given priority hierarchy can easily be modified by swapping the content of each channel with that of any other channel. The channel numbers assigned to each 1K bit array in the CTR are internally controlled and managed within the DCP.

Figure 7:
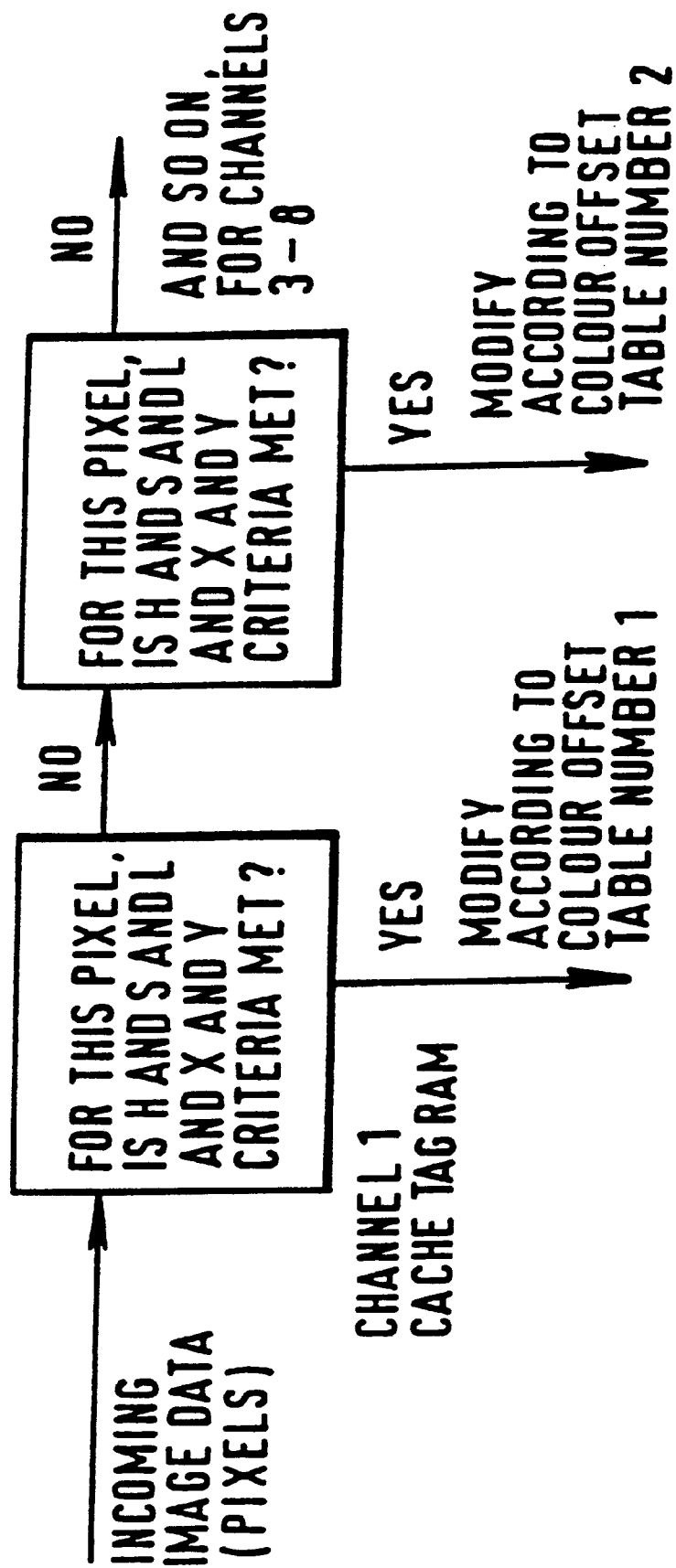
FIG. 7 is a flow chart illustrating the channel priority logic in the pixel identification table of FIG. 2.

The priority logic is shown in more detail in FIG. 7. For example, if channel 1 has been loaded to tag red colors and change them to blue, and channel 6 has been loaded to tag light colors and change them to dark, a pixel with a light red color will be corrected and changed to light blue by channel 1. It will not be corrected by channel 6, because channel 1 has priority. If the operator does not like this result he can reorder the priority by swapping the contents of channels 1 and 6. Channel 1 will become the light color channel and channel 6 will become the red channel. Thus, a light red will now be controlled by channel 1 and changed to dark red.

D. Texture and Sharpness Detection

The DCP can also sense and respond to texture. Texture can be sensed on the basis of an analysis of luminance values according to standard methods as described, for example, in Pratt at 503–511, incorporated by reference. Texture is detected by analyzing the luminance data in a series of lines in the pixel by known methods, according to criteria such as spatial frequency and randomness. A spatial correlation function is defined in equation 17.8–1 on page 506 in Pratt. No one pixel can define a texture. A group of pixels is needed to define a texture. Pratt recommends a window of about 6×6 pixels to define texture, at page 507.

Likewise, sharpness can be detected even more simply. Page 319–325 of Pratt displays a method for detecting sharpness. Simply described, looking at a 3×3 window of pixels, if all of the pixels are similar to one another, the area is not very sharp, whereas if there is a large difference between one area of the window and another, then that area is considered sharp.

Figure 8:
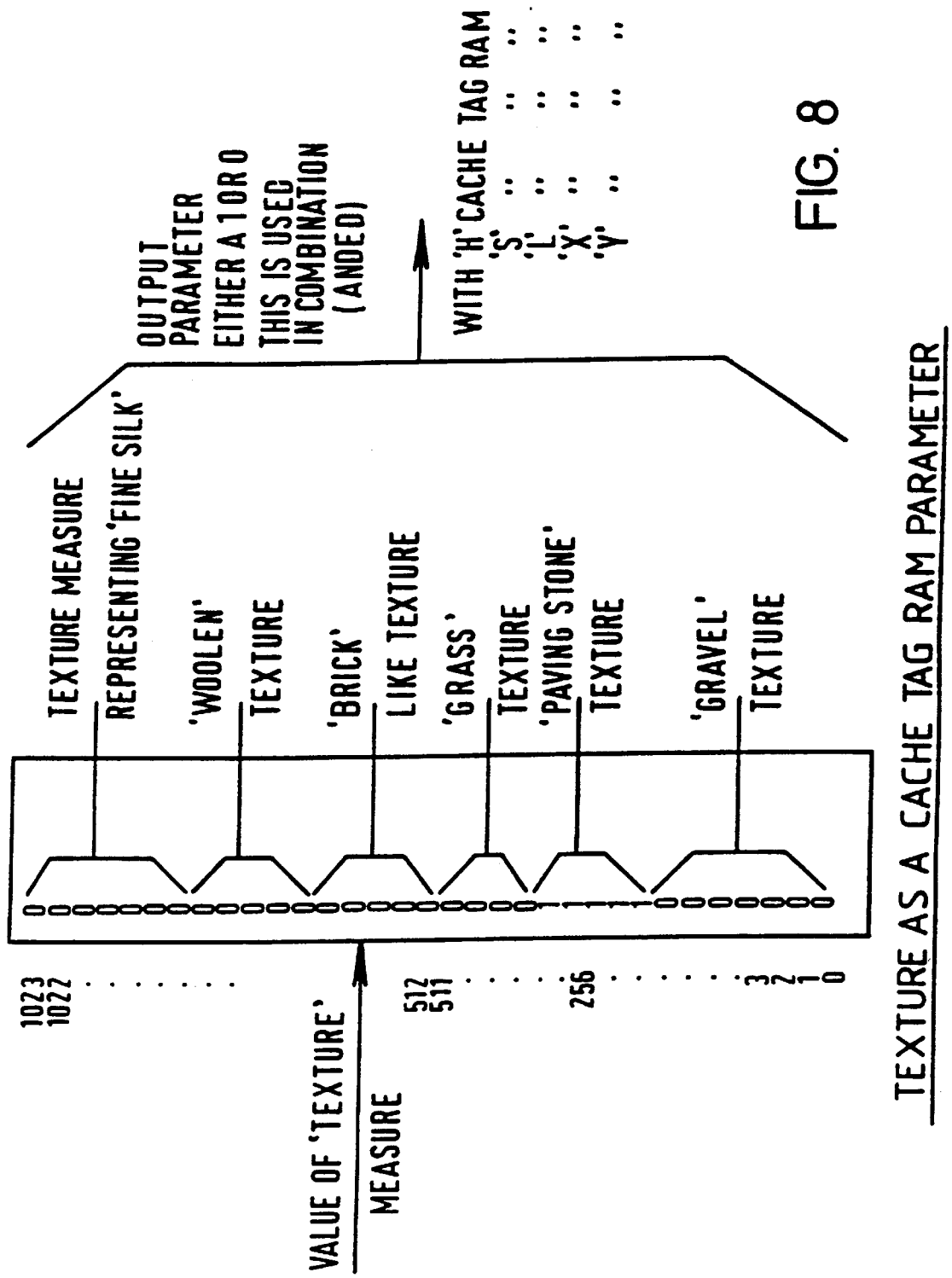
FIG. 8 is a schematic diagram showing the use of a cache tag RAM to store selection criteria corresponding to video textures.

FIG. 8 shows an alternative cache tag RAM which can be set up for responding to texture. Address ranges in the RAM are arbitrarily assigned to correspond to different types of texture.

As seen in FIG. 1, luminance data are loaded into a multi-line store 11a and then the data in the store 1a are analyzed by a texture evaluator 11b. The time delay provided by the delay 5 is adjusted to accommodate the cycle time of the store 11a. Depending on what texture is detected, a predetermined 10-bit word can be outputted as a T signal to the pixel identification table 15. If the output of the texture evaluator 11b is, for example, binary 512, indicating a brick-like texture, then when that word is applied as an address to the texture RAM shown in FIG. 8, a 0 is found to be entered at address 512. Therefore, the particular group of pixels being analyzed for their texture will not be selected for any modifications. On the other hand, if the texture of paving stone is detected, then an output number, for example, binary 256 will be outputted to the pixel identification table 15. As seen in FIG. 11, address 256 has a "1". Therefore, the output from the texture RAM will be 1. This output is "ANDed" with the respective output of the H, S, L, X and Y RAMs, and if the ANDed result is "true" then it is determined that the pixels then being detected for texture have been tagged for modification.

E. User Interface

The user interface of the DCP is designed for "user-friendliness". When initially turned on, it emulates prior 6-vector secondary color correctors such as the RCA Chromacomp, which merely give the operator direct control over the relative proportions of six specific colors, the primaries (red, green and blue) and the secondaries (cyan, magenta and yellow). Operators have come to think in terms of those six colors. The Da Vinci gave greater control, dividing the color circle into 16 hues, but still, the Da Vinci controlled only hue. In contrast, the DCP also controls luminance, saturation and other picture attributes.

To make the DCP more user-friendly, its user interface initially displays six channels configured as a standard six-channel color corrector. In contrast to the standard corrector, however, the locations of the six vectors are not fixed, but rather can be "steered" so that each of the six channels can control any desired color. In the preferred embodiment, two additional channels are provided as well, giving a total of eight channels, although those last two channels are not initially displayed, but instead may be activated manually.

For example, the initially displayed red, magenta and yellow channels could all be "steered" to control three different shades of red. The operator might then wish to use the additional channels 7 and 8 to control magenta and yellow.

Figure 9:
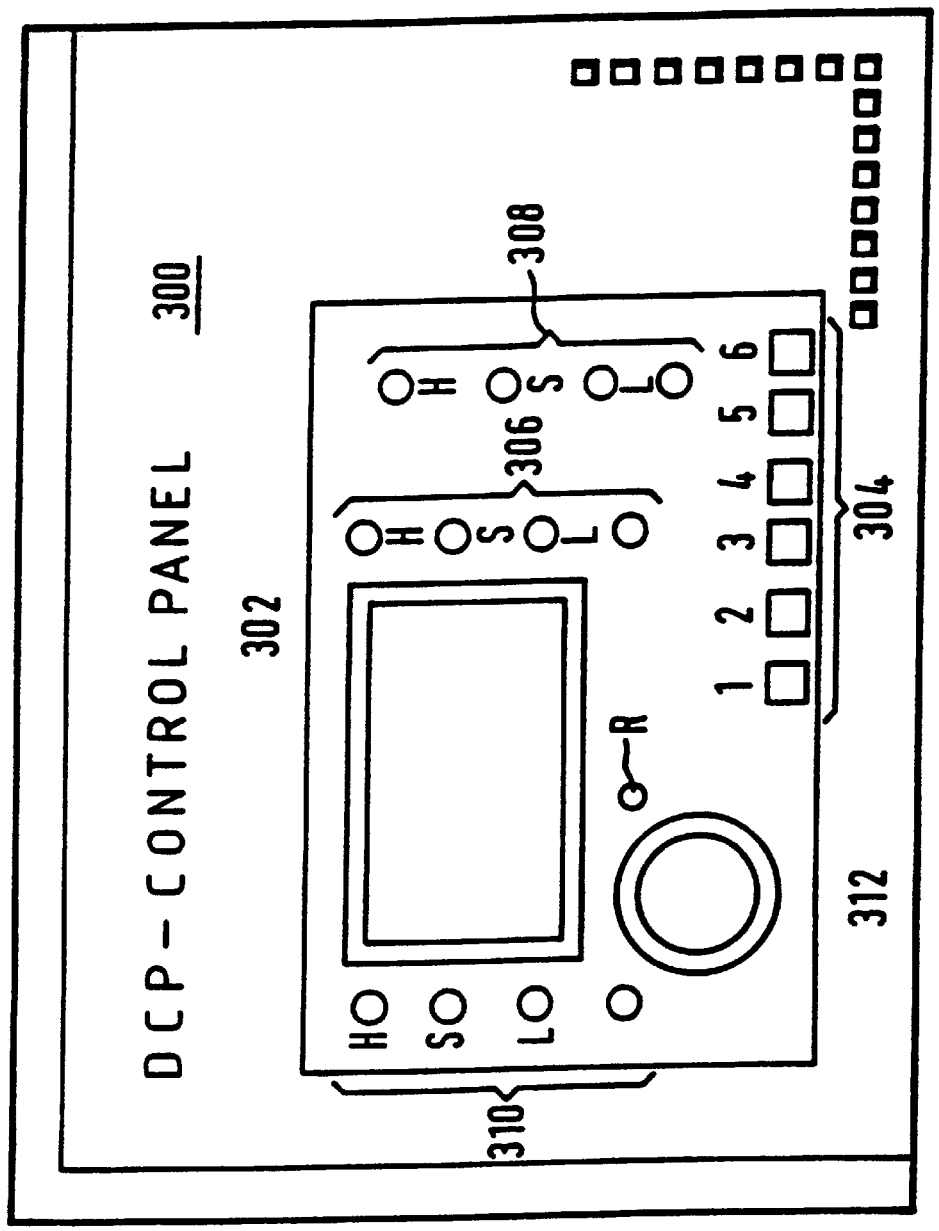
FIG. 9 is a simplified illustration of the control panel of the DCP.

The control panel 300 of the DCP is shown in FIG. 9. As seen therein, there is an electroluminescent display panel 302, which may be a color or monochrome liquid crystal display. The EL panel 302 displays the current selected parameters. Preferably the EL panel 302 is also touch-sensitive. The control panel 300 can be used in a free-standing mode to manipulate color and the other parameters that the DCP operates on. However, as in most post-production devices, the usual mode of operation will be under the control of a programmer/controller such as the POGLE.

A group of six buttons 304 correspond to the six channels that are initially available according to the preferred embodiment of the invention. A group of dials 306 (preferably rotary encoders) are provided for setting the upper boundaries of selected H, S, or L ranges, while a second group of dials 308 are provided for setting the corresponding lower bounds of the selected ranges. Extra dials are provided which can be set for detecting sharpness, location, texture, etc. output H, S, L controls 310 are also provided to set, e.g., the amount of correction to be applied to H,S,L or another attribute.

Figure 12:
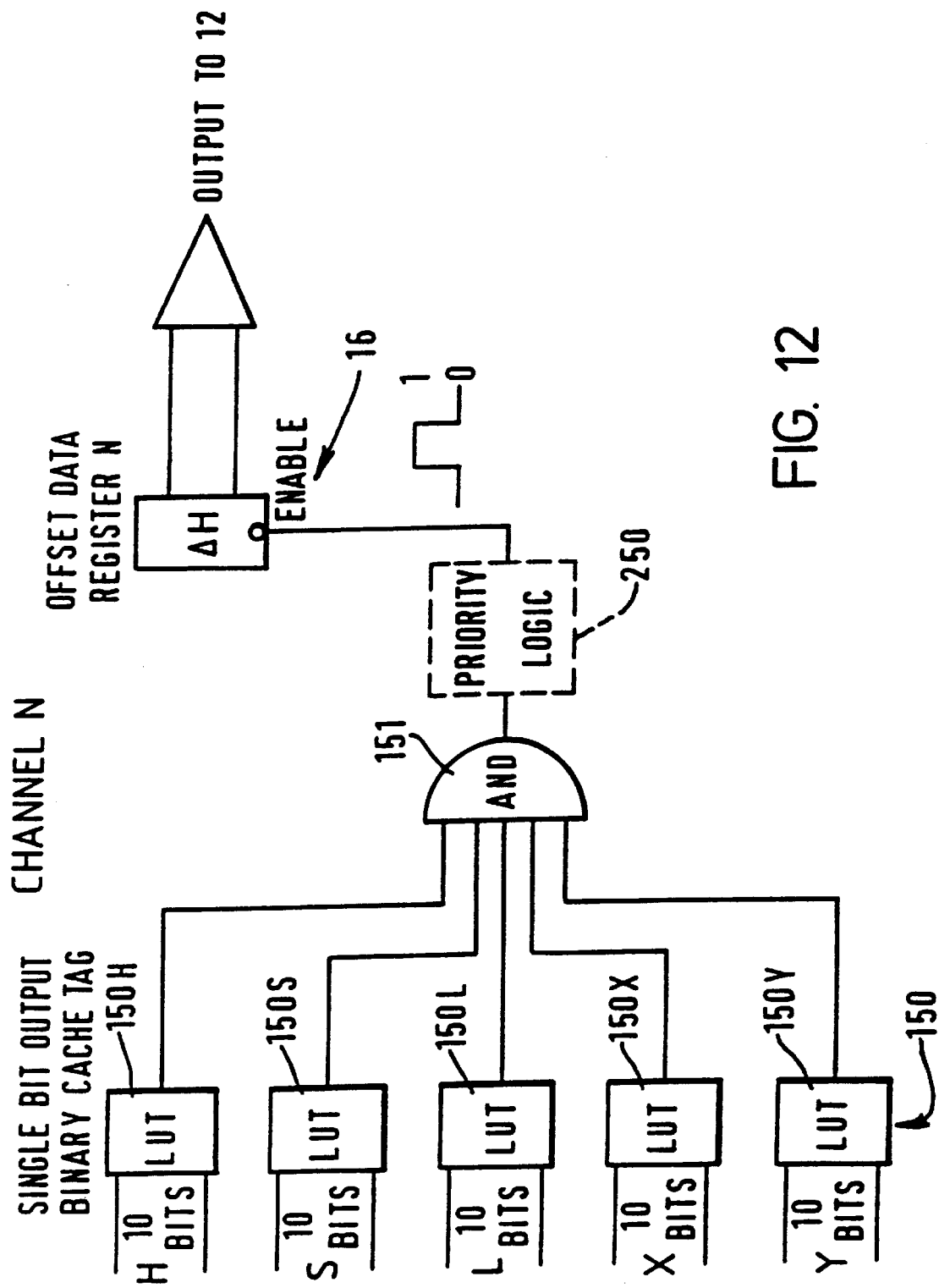
FIG. 12 is a logic diagram showing a set of cache tag RAMs corresponding to various pixel attributes for one channel, and the priority logic, in the pixel identification table, as well as the offset register for hue for that channel within the offset table.

A trackball 312 is a universal device which can point and click on any menu option. All of the above functions, including those that correspond to control buttons, are also accessible by means of the trackball, as well as via the touch screen 302 when the menu options are displayed on screen. Likewise, the trackball and/or touch screen are used to control the seventh and eighth channels for X and Y information. A reset button R is also seen in FIG. 12.

F. Relative Tag RAM

Figure 5A:
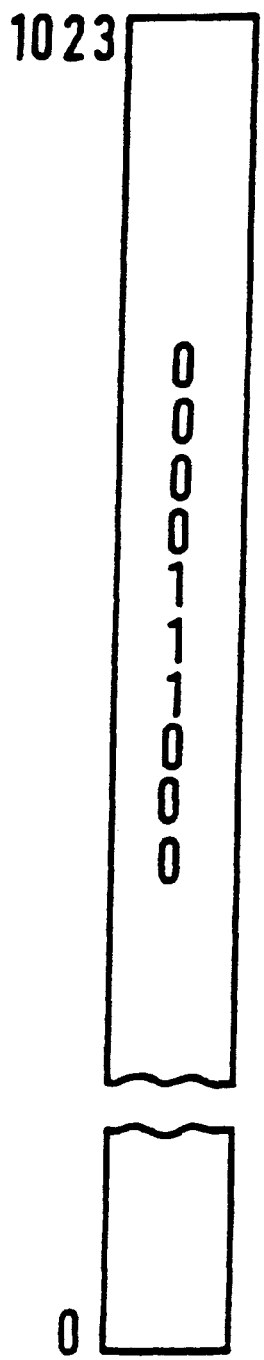
FIGS. 5A and 5B show a side-by-side comparison of a cache tag RAM containing one bit at each memory location versus a cache tag RAM containing 3-bits at each memory location.

A modification of the disclosed architecture would have a relative or "grey" tag RAM, instead of "binary". Instead of the disclosed architecture (FIG. 5A), wherein the cache tag RAM provides a binary lookup for each channel, giving the limited capability of tagging colors to "modify" or "not modify," there would be a relative or "grey" value (FIG. 5B), for example in a range of binary 0–8, at each location in the H, S and L offset tables. Relative modifications would help to avoid the possibility of a discontinuity at a boundary between colors that are modified and not modified (in the absence of a convolver or some other facility for smoothing the boundary).

The grey level cache tag RAM would avoid such a discontinuity, by marking each specific shade with an indication of how much it is to be modified. For example, mid-reds could be tagged to be strongly modified, while light and dark reds would be tagged for a slight modification. This would improve the naturalness of the resulting picture.

Figure 13:
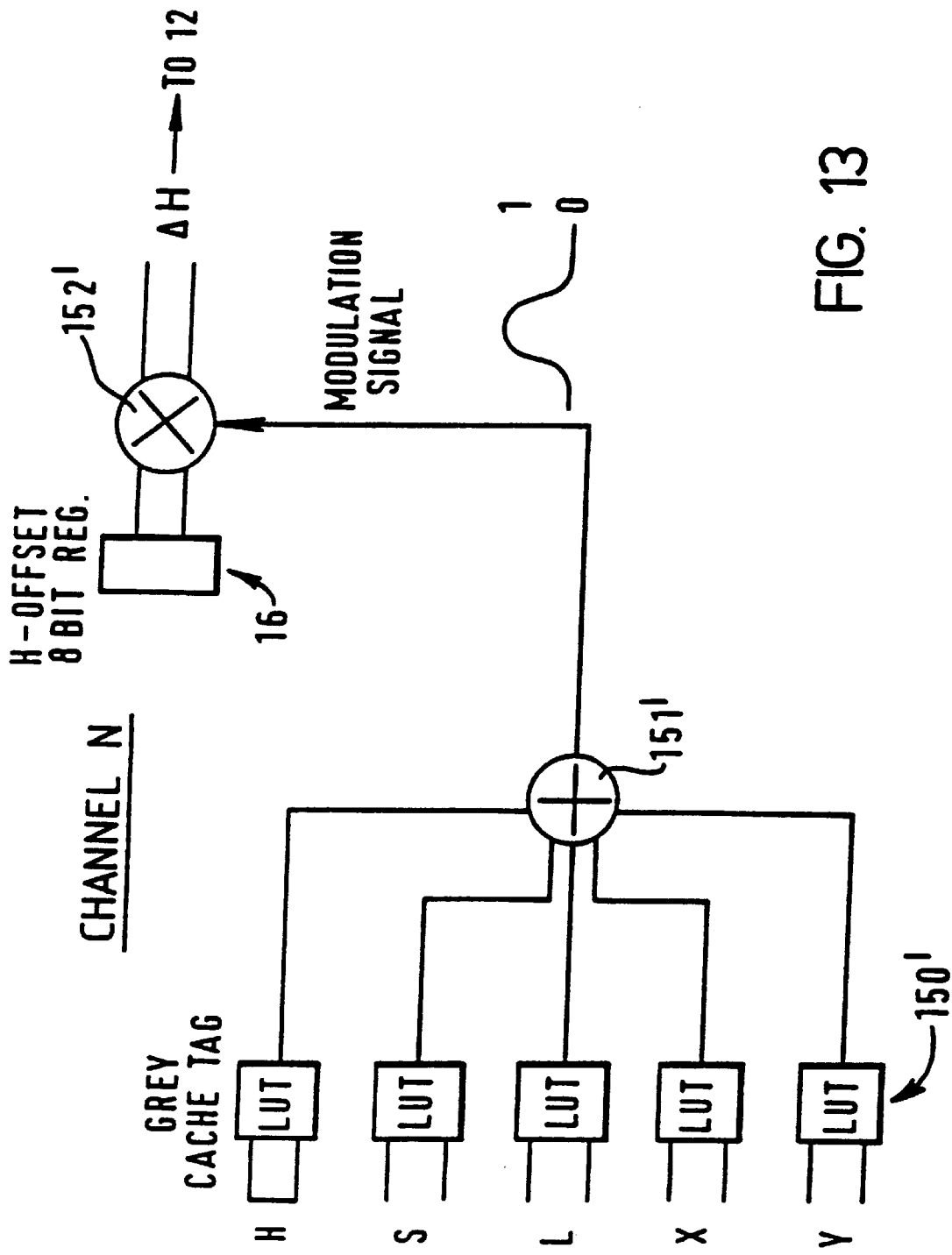
FIG. 13 is a schematic block diagram showing a first form of a relative or grey-level cache tag RAM.

FIG. 13 illustrates the operation of a relative or "grey-level" cache tag RAM of the type shown schematically in FIG. 8B.

By comparison, the preferred embodiment, as shown in FIGS. 1, 2, 5A, and 12, for example, employs a binary or "tag/no tag" RAM. Pixels are either tagged for alteration or they are not tagged. Thus the output of the AND gate in FIG. 12 is either a 1 or a 0.

FIG. 12 shows the respective single-bit H,S,L,X and Y RAM's (lookup tables) 150H, 150S, . . . , that are part of a single channel N of the DCP. For a given pixel, the respective H,S,L,X and Y data for that pixel are applied to the lookup tables of channel N, and the outputs thereof are ANDed by an AND gate 151. Assuming that channel N is given priority by the priority logic (FIGS. 2 and 7), then the respective offsets in the offset data registers N, corresponding to channel N, will be outputted to the combiners 12. Only the ΔH offset register N is shown in FIG. 12. The contents of the ΔH offset register N are not modified in any way.

Figure 5B:
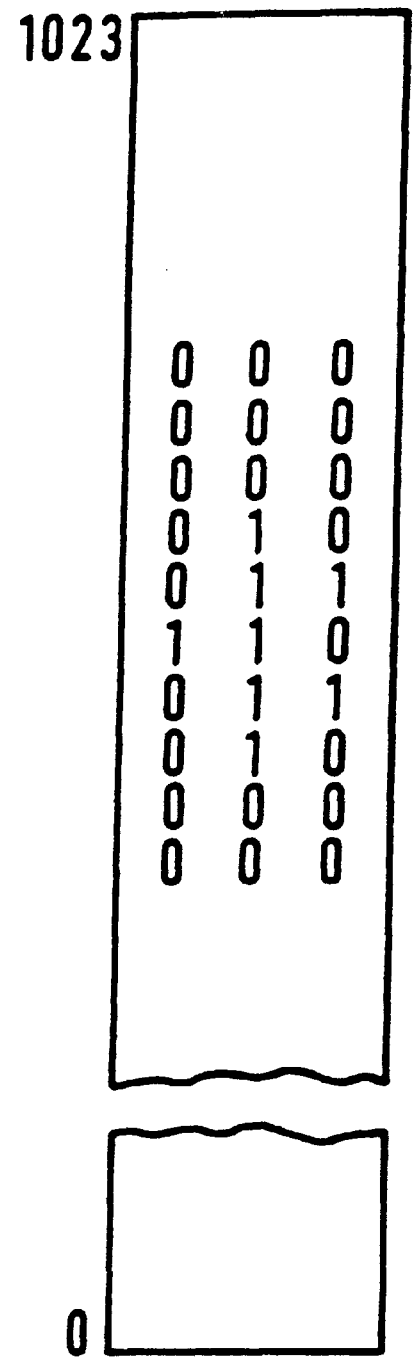

According to the variation in FIG. 13, in contrast with FIG. 12, a spectrum of light, medium and heavy tagging and in-between levels is provided. The H,S,L,X and Y registers tag with a byte rather than a bit, for example a 3-bit byte as shown in FIG. 5B. The outputs of the respective registers in response to a given input pixel may vary from binary 0 to 7. These outputs are added by the adder 151' to obtain a smoothly variable modulation signal. The content of the offset register 16 for the corresponding channel is, for example, a constant and is multiplied at 152' by the modulation signal to obtain the output ΔH for the combiners 12.

Figure 14:
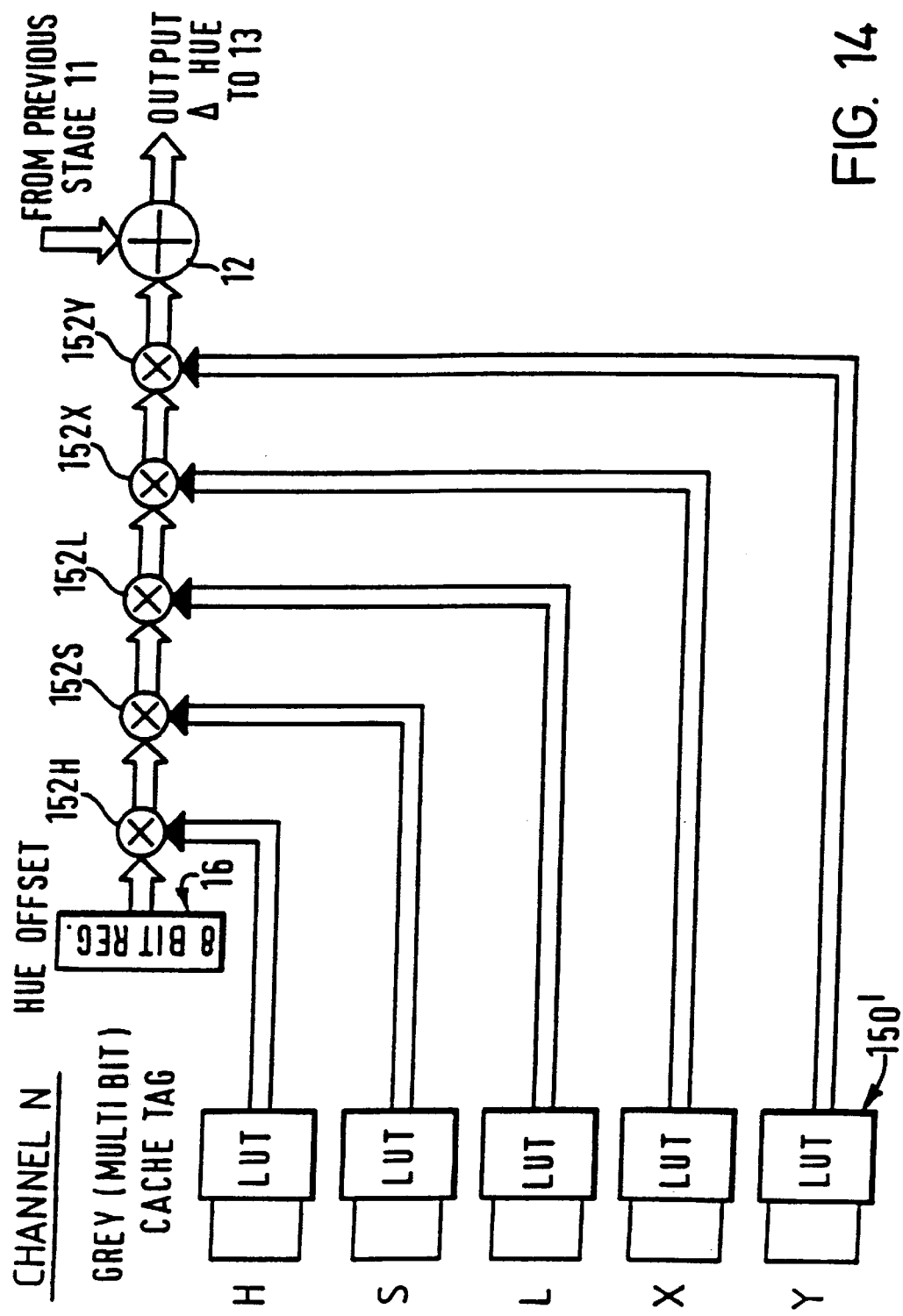
FIG. 14 is a schematic block diagram showing a second form of a relative or grey-level cache tag RAM.

A further, more complex variation is seen in FIG. 14, with cross-modulation of signal attributes. The H,S,L,X,Y registers 150' and the channel offset register 16 for channel N are the same as those in FIG. 13. However, the constant output of the offset register 16 is combined with the outputs of the registers 150' by a plurality of multipliers 152H, 152S, 152L, 152X, 152Y which are arranged in series.

The embodiments of FIGS. 13 and 14 enable the DCP to modulate the replacement hue, for example, as a function of saturation, luminance, etc. The embodiment of FIG. 14 can be expected to give finer control.

For example, in the binary pixel identification table of FIG. 12, a certain range of red hues may be selected for alteration, and other red hues will not be altered. If high ranges of saturation and luminance parameters are also selected, then since the respective hue, saturation and luminance RAM outputs are ANDed, that given range of red hues will be selected and altered only when they have, for example, high luminance and high saturation.

Figure 15:
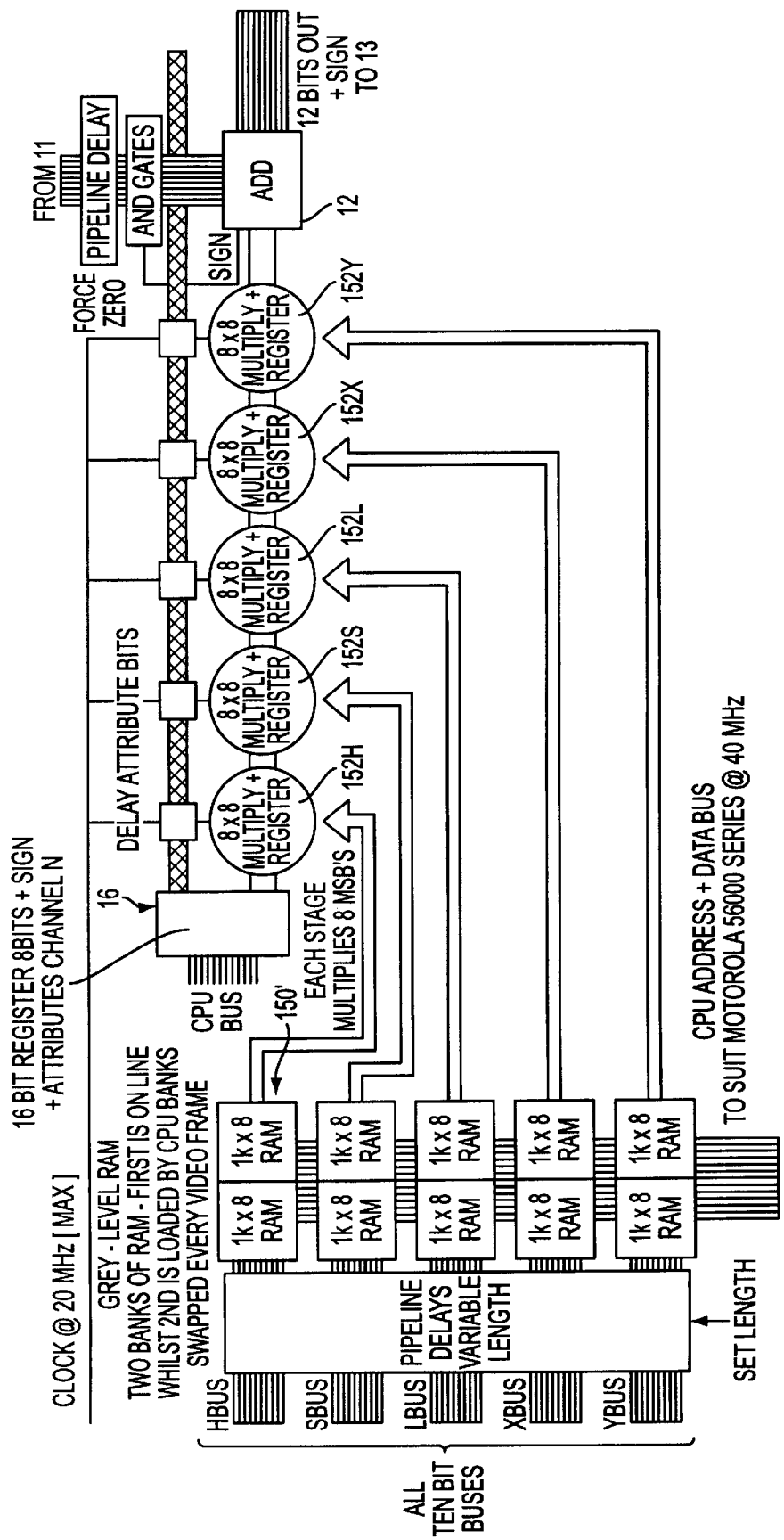
FIG. 15 is a more detailed block diagram corresponding to the arrangement of FIG. 14.
Figure 16:
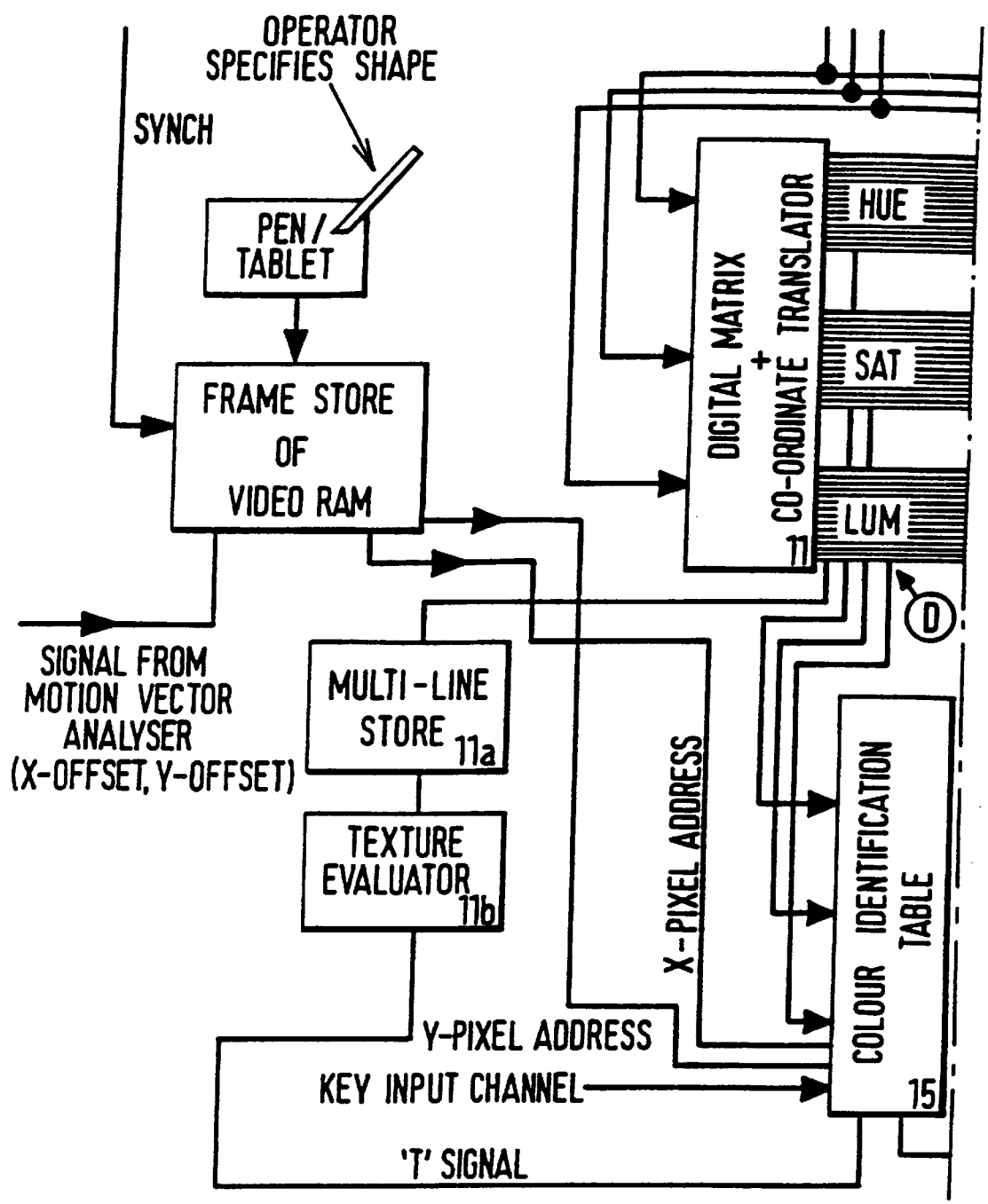
FIG. 16 is diagram showing how the system of FIG. 1 may be modified to accept positional information.

In contrast, in the relative or grey level cache tag RAMs in FIGS. 13 and 14, it is possible not merely to modify or not modify, but rather, to apply light, medium, or heavy modifications, or levels in between. The relative output values from the luminance and saturation RAMs in FIG. 13 will be added with the hue output value, and the resulting signal will be used to modify the contents of the offset register 16. The embodiment of FIG. 16 is somewhat less expensive, in that only one adder 151' and one multiplier 152' are required. On the other hand, the embodiment of FIG. 14 is more expensive, requiring at least five multipliers, but is mathematically appropriate and can be expected to give finer control FIG. 15 shows the hardware implementation of the embodiment of FIG. 14 in more detail.

G. Offset Table

Having identified the regions to modify and not to modify with the pixel identification table 15, the amount those regions are to be modified is then specified by the offset table 16, which in this embodiment of the invention provides respective H, S, and L offsets. See FIG. 12. The offset table 16 is a series of registers which are addressed by the output from the CTR 15, only one being shown in FIG. 12.

The offset RAMs hold an H offset, S offset, and L offset for each H, S, and L value to be modified in each channel. The starting value in each register for each channel is zero. The operator can increase or decrease these values by means of rotary controls.

As a simple example, assume that a video scene contains two differently colored objects, for example a red car and a yellow car. It may be desired to change the yellow car to red, to match the color of the red car. The operator specifies the channel in which the hue of the yellow car is to be stored, and identifies the yellow car by storing the exact hue value of the yellow car within the pixel identification table 15. In practice, the operator can position a cursor on the yellow car and the hue of the yellow car will be stored automatically. Then, the operator inputs an appropriate color offset in the channel of the offset table 16 corresponding to the yellow car's channel in the pixel identification table 15. To do this, the operator selects the channel of the yellow car and rotates an appropriate control for incrementing or decrementing the hue register for that channel, until the correct value is found, such that the color of the yellow car now matches the color of the red car. Then the operator manually stores that offset value in the offset table 16 with a control on the DCP. Having set up the pixel identification table 15 and the offset register 16 in this way, the circuitry will react to each pixel having the identified yellow hue that appears within the video signal, causing the stored offset for that channel to be added to the hue value of that pixel by the adder 12. Thus the output of this stage will cause all pixels having that yellow hue to be changed to red pixels.

X and Y offsets can also be supplied if it is desired to modify the X and Y coordinates of a pixel.

The offset table can also be employed to modify the sharpness of a region, for example in response to a particular texture or sharpness detected by the texture evaluator. For that purpose, the offset table 16 would be loaded with appropriate data for setting the convolver 7a to modify the sharpness of that region, according to a known process. Such a process is performed by known Rank Cintel telecines, which employ a single number as an input to a convolver to control sharpness or softness.

One advantageous use of sharpness modifications by means of the convolver 7a might be as follows. It might be necessary to remove the "beating" of a high-frequency, shiny car radiator grill. It would be possible to detect the region to be altered (the car radiator) by its high luminance. Then, having detected that region, the convolver 7a would be supplied with data from the offset table 16 causing it to modify the sharpness of that region, to blur it slightly and remove the beating effect from the final picture.

As a further improvement on the foregoing example, it would be possible to select the radiator but avoid inadvertently selecting the sky, which also has high luminance. By ANDing the sharpness parameter and the luminance parameter, the car radiator would be selected, because it has both high luminance and high sharpness; but high-luminance, low-sharpness regions such as the sky would not be selected.

In other words, the pixel identification table 15 is loaded with data for a given channel to identify regions of high luminance. The offset table 16 is loaded with a parameter to control the degree of smoothing applied to those regions for that given channel, and that parameter is supplied to the convolver 7a and employed for smoothing the output of the DCP. In this example, it is only desirable to smooth certain areas of the picture, namely those areas that have been selected for modification. It would be undesirable to smooth the entire picture, which would make it look soft and lose picture detail. Therefore, the convolver 7a is only activated for those regions that have been selected for modification. To summarize, the pixel identification table 15 selects where to convolve, while the offset table 16 controls how much to convolve.

H. Signal Modification

These offsets are then combined with the original H, S, and L values of the original (possibly downsampled) signal by means of combiners 12, by specific rules; namely, H offsets are added, while S and L offsets are multiplied. Although these rules are not absolutely necessary to carry out the invention, it has been found experimentally that following these rules gives the most natural appearance. H corresponds to a phase angle or vector, while S and L are magnitudes. So, for example, multiplying either S or L by a modification factor of +N % will give the same apparent degree of modification for both large and small starting values of S and L, which is desirable. On the other hand, since H is a phase angle, the H modification amount should be added, not multiplied, in order to obtain results independent of the starting value.

The resultant modified H, S and L signals are then converted to modified red, green, and blue signals R', G' and B' by a digital matrix and coordinate translator 13.

At this point, this modified signal could be sent direct to the output. However, that would be undesirable for at least two reasons. First, the entire video signal has been processed twice, to convert from RGB to YUV to HSL to YUV and back to RGB. Even with the use of digital circuitry, there are cumulative mathematical errors within this process that would cause distortion to the entire video signal, whether or not color-corrected. Second, as the color correction has been performed in HSL color space, it is possible that illegal combinations of color may have been introduced into the RGB signal after passing through the output matrix. In order to overcome these problems a further processing stage is used.

The output of the unit 13 is provided to a combiner 14. The combiner 14 compares the newly modified RGB signal to the original RGB signal that has not passed through the processing loop. The combiner looks for differences between the two signals and performs two separate functions simultaneously: (a) the combiner has knowledge of which pixels should have been modified, by checking the output of the pixel identification table 15. It therefore assumes that any differences, if no channel was selected, are due to mathematical errors and these can therefore be removed; and (b) the modified RGB signal (and with mathematical errors removed) is subtracted from the original RGB signal to produce an error signal.

The combiner 14 takes the values R',G',B' and subtracts from them the original R,G and B from point B (or vice versa), to obtain modification signals $\Delta R$, $\Delta G$ and $\Delta B$. The modifications signals are then compared with the original $\Delta H$, $\Delta S$ $\Delta$and $\Delta L$ by the combiner 14 so as to avoid unintended modifications. For example, if the offset signals $\Delta H$, $\Delta S$ and $\Delta L$ are zero, then no modification was intended and the $\Delta R$, $\Delta G$ and $\Delta B$ outputs from the combiner 14 are forced to zero. It is assumed that if they are non-zero, that is merely the result of small limited-precision mathematical errors that arose in the units 11–13 or elsewhere. This feature contributes substantially to keeping input signals free from corruption if they are not intended to be modified. Known ESCC's would propagate such small errors, resulting in slight modifications of the picture where none was intended.

It is these error signals $\Delta R$, $\Delta G$, $\Delta B$ which are used to modify the original clean RGB signal which is timed to then be passing through the delay stage 5.

Then these modification signals are applied to a convolver 17. A well-known convolution technique that may be employed is disclosed in William K. Pratt's book *Digital Image Processing* (John Wiley & Sons 1978), ISBN 0-471-01888-0, at 319 and 322-25, incorporated by reference. In the disclosed technique, which is only one of many available for removing noise or artifacts, each pixel is sequentially examined, and placed at the center of an imaginary 3×3, 5×5, or similar pixel array. If the L, for example, of the pixel is mathematically greater than the average of its immediate neighbors by some threshold level, it is replaced by the average value.

The present system is particularly concerned with identifying complex areas within which pixels may be modified. As a first step it is necessary to define the shape and identify the pixels within it. A simple way of doing this is to mark critical points on the shape, which can then be joined up to define the outline of the shape.

There thus exists a need to store the co-ordinates of a number of points in two dimensional space which will be used in defining a two complex dimensional shape. One possibility would be to set up an area of memory which has a location for every possible point. Thus, if the area in which the shape may appear occupies 256×256 pixels there will be 65536 locations, one for each pixel. Each location will contain a 0/1 value indicating whether or not the pixel is relevant. this may be a reasonably powerful technique but it has high memory requirements.

There is thus proposed an arrangement in which two tables are set up, one having a location for each of the possible x co-ordinates and one having a location for each of the possible y co-ordinates. Thus, in the example above there would be an x co-ordinate table with 256 locations and a y co-ordinate table also having 256 locations. This is the cache tag ram system described earlier.

In a simple arrangement described earlier where it is desired to define only a rectangle, there will be 1's in each of the x co-ordinate and y co-ordinate locations within the rectangle, and 0's in each of the other locations. The following table shows an example.

TABLE 1

| x location | value | y location | value |
|---|---|---|---|
| 0 | 0 | 0 | 0 |
| 1 | 0 | 1 | 0 |
| 2 | 1 | 2 | 0 |
| 3 | 1 | 3 | 1 |
| 4 | 1 | 4 | 1 |
| 5 | 1 | 5 | 1 |
| 6 | 1 | 6 | 0 |
| 7 | 0 | 7 | 0 |
| 8 | 0 | 8 | 0 |

By carrying logical AND operations it will be established that the region selected has x co-ordinates between 2 and 6, and y co-ordinates between 3 and 5. This defines a rectangle which is 4×2 units and positioned centrally of the overall space being considered.

Such a system is however limited to rectangles. Whilst that will be adequate for many situations, it is often desired to define more complex shapes.

To define more complex shapes it is necessary to store the locations of discrete points. It is possible to store the co-ordinates of a single point in the tables referred to above but if three points—the minimum number to define an enclosed area of space—are to be stored then problems arise. Each table would have three x locations tagged and three y locations tagged but there would be no way of determining which x location is associated with which y location.

The tables mentioned above are purely binary, storing the values 0 or 1. However, it is possible to establish tables which can store a number of bits in each location, thus enabling a larger number of values to be stored. Thus, for example, an 8 bit capability would enable the storage of 256 values, i.e. 0 to 255. By storing a specified value in an x co-ordinate location and the same value in the associated y co-ordinate location, the co-ordinates can be linked.

By way of explanation, the table below shows how it would be possible to define a triangle:

TABLE 2

| x location | value | y location | value |
|---|---|---|---|
| 0 | 0 | 0 | 0 |
| 1 | 1 | 1 | 0 |
| 2 | 0 | 2 | 1 |
| 3 | 0 | 3 | 0 |
| 4 | 2 | 4 | 3 |
| 5 | 0 | 5 | 0 |
| 6 | 3 | 6 | 0 |
| 7 | 0 | 7 | 2 |
| 8 | 0 | 8 | 0 |

The triangle has its corners at 1,2; 4,7; and 6,4.

There is however a further problem. With larger numbers of co-ordinates it is not possible to determine the order in which they should be joined up to define the desired shape. Quite different shapes can be defined by passing between co-ordinates in different orders. This problem is overcome by assigning to each chosen co-ordinate a number which not only links it to its partner but also defines the order in which lines would be drawn between the co-ordinates. The following table shows how four sets of co-ordinates can define a quadrilateral.

$$A = \sum_{j}^{N-1} \sum_{i}^{N-1} i^2 = \sum_{j}^{N-1} \sum_{i}^{N-1} j^2$$

$$B = \sum_{j}^{N-1} \sum_{i}^{N-1} 2ij$$

$$C = \sum_{j}^{N-1} \sum_{i}^{N-1} 2(C\theta - d_{ij})i$$

$$D = \sum_{j}^{N-1} \sum_{i}^{N-1} 2(C\theta - d_{ij})j$$

The quadrilateral has its corners at 2,2; 7,3; 8,8; and 3,7.

However, by maintaining the same points but altering the order a different shape can be obtained. Thus by altering the order of the 8,8 and 3,7 points, two triangles will be defined by means of intersecting diagonals. This is shown in the following table, where the order of these two points has been swapped.

TABLE 4

| x location | value | y location | value |
|---|---|---|---|
| 0 | 0 | 0 | 0 |
| 1 | 0 | 1 | 0 |
| 2 | 1 | 2 | 1 |
| 3 | 3 | 3 | 2 |
| 4 | 0 | 4 | 0 |
| 5 | 0 | 5 | 0 |
| 6 | 0 | 6 | 0 |
| 7 | 2 | 7 | 3 |
| 8 | 4 | 8 | 4 |

It will be appreciated that this particular way of using table only permits any co-ordinate to be used once. Thus, a square defined by the co-ordinates 2,2; 7,2; 7,7; 2,7 cannot be set out as each x and y co-ordinate is used twice. for example, x location 7 cannot be defined in the table as having order number 2 with y co-ordinate 2, and order number 3 with y co-ordinate 7. There are various ways of overcoming this problem.

It must be borne in mind that the principal purpose of this system is to permit shapes to be defined for the purposes of video editing, colour correction and so forth. Typically an operator using a light pen, tablet, mouse or the like will select a few key points. The accuracy of these may not be pixel perfect and indeed there may be no absolutely clear boundaries. It is therefore of little practical importance if, in a 256×256 pixel region, a point is one pixel or even more away from its "ideal" position. Accordingly, if a particular x or y location already has an entry the next location can be used. In the above example of the square, the result could be the quadrilateral—a parallelogram—of Table 3. Obviously, at this scale the difference between the two shapes is marked, but this is in a very small region for explanation purposes only. Over a larger region and with shapes of more realistic sizes, the differences will be acceptable.

Another approach would be to repeat the locations in the tables. Thus, a 256 location table could be split into two 128 location tables. Thus, x co-ordinate 2 would be at location 2 and at location 130. This could be done as many times as desired, depending upon the maximum number of locations available, the likely number of points that would be defined and the likely number of occurrences of a repeated co-ordinate.

Thus, there is provided a way of defining critical boundary points of a complex shape using x and y co-ordinate tables. The system uses the cache tag ram technique referred to earlier, and in the preferred form uses the relative RAM described earlier. There are, of course other ways of storing such co-ordinates and these could be used even though they are not the preferred methods. It would also be possible to use another co-ordinate system, i.e polar co-ordinates with r,θ values.

Once the critical points have been identified, the lines between the points, going in the correct order, are defined. These can be straight lines, calculated curves, parabolic fits or complex bicubic spline fits. There are many known ways of achieving this. The subsequent data structure is then converted into a raster line structure, using known techniques and hardware, i.e. a raster image processor (RIP). The edges will now appear in sequential scanning lines. Thus, for each line there will be a series of zero values but with a 1 at the appropriate pixel location(s) where the line intersects the outline of the shape. Of course some lines will not intersect the outline at all. It is then necessary to "fill" the shape. There are known processes for doing this.

For example, starting with an assumed zero at pixel 1, line 1 one can increment the pixel count until a 1 is encountered. Then fill with 1 values until another original 1 is encountered, following which zero values will be entered. Of course, with complex shapes there may be further intersections on the same line. This is a simple example of a fill algorithm and more complex algorithms are known to one skilled in the art.

The data defining the pixels which are within the shape is then stored in a suitable location such as a video frame buffer.

It may be desirable to blur the edges of the object. Thus a convolving technique could be carried out using a filter mask such as an FIR (finite impulse response) filter, an IIR (infinite impulse response) filter or a laplacian filter. These are described in Platt, pages 322–327. There will be produced "grey" values ranging from zero to all bit sets at a point well inside the object, through grey or intermediate values at the edges. It is important to note that the convolving takes place on the data identifying the relevant pixels, and not on the actual image data.

Ideally the hardware design allows for the reloading of the coefficients of the laplacian or other filter on a frame by frame basis. This is because, depending upon the content of a given picture, the coefficients may change. For example, an object such as an automobile may move across a screen. In the centre of the screen the automobile may pass under the shadow of a tree. In this lighting condition the coefficients of the given mask may have to be radically different to produce a useable edge, compared with the coefficients that produce a good edge when the automobile is well lit in strong sunshine. Another situation is where objects overlap. This may happen where there are two or more objects in the picture that are to be tracked. This presents no problems in general, as the DCP architecture is multi-channelled. However, the tracking of multiple objects is essentially a serial operation. By utilising coefficients of different edge strength for each object, it is possible to resolve priorities of objects which overlap. The architecture allows the reloading of the mask coefficient at a rate at least as fast as once per frame.

A further enhancement is the addition of a further processing module which can analyse the image content of a given frame and find the edges automatically. Hardware devices are known which can extract images or produce edge maps at reasonable data rates. This could be a background process, and the taking of, say, half a second per frame is not a serious impediment.

One method of carrying out such a method is to perform the edge extraction process only upon key frames. Many of these will be adjacent scene changes, so that they delineate scenes. Several frames will normally also be specified as reference frames which are studied in detail for optimum transfer. Carrying out the edge extraction process on key frames reduces the computational load, as compared to carrying it out on every frame. Intermediate frames between key frames can then be tracked and the vertices followed from frame to frame. There are a number of block matching techniques, as discussed for example, in Platt. The process leads to shapes being detected in the frames between the key frames.

Of course, it is possible to track objects using the simpler rectangular regions discussed earlier. In general the technique is to identify the shape in a start frame, identify it in the finish frame, and then allow the system to track the shape across the screen. It may be necessary to identify the object in one or more intermediate frames. Where the appearance has changed, then this will be taken into account. For example a car may turn a corner, or may move rapidly into the distance, getting smaller. The system preferably generates automatically the approximate shape and position for each of the frames between those on which the object has been marked. There are techniques for doing this.

In a practical system an operator may simply mark the object in the beginning and end frames, and see how the results turn out. If they are unacceptable, then intermediate frames can be identified and the object marked out on these. In the very worst case, of course, every frame will have to be analysed.

In FIG. 16 there are shown changes to the DCP system described above. As will be seen the synch signal is fed into a frame store. Into this may come input from an operator, e.g. via a pen/tablet or a tracker ball or other device, and/or a signal from a motion vector analyser giving the x-offset and y-offset. From here the x-pixel address and y-pixel address are fed to the table 15. The output from the system, for use in manipulating objects, will generally be in the form of a key signal.

By using the techniques above, it is possible to identify a car which is of complex shape, to track it across the screen, and to alter the colour of a particular component. For example, red rear lights could be changed to orange or green.

In some cases it will be possible to identify an object exclusively by colour alone. In other cases, it can be identified by position alone. However, by combining the two it is possible to track objects in complex situations.

It will be appreciated that the systems described are not confined to simply correcting colours. By identifying an object by means of whatever information is available and required to identify it exclusively, it is possible to carry out many other manipulations. Thus the modification of selected pixels may go beyond what would normally be classified as colour correction. The changes made may amount to complete eradication of an object and its replacement by another object or even just a background.

Thus consider the situation in which a camera is fixed, pointing at a static background. A car then drives steadily across the picture. By picking out the outline of the car on the first frame containing the car, and on the last frame, it can be tracked. If there are two cars, one red and one green, then it is possible to ensure that the correct car is tracked by specifying that pixels within the outline must be of the appropriate colour. Consider the red car only. It is possible to build up difference tags to find out which areas were red at one time and not at a later or earlier time. It is therefore possible to replace all of the red car pixels by background pixels as they were when the car was not there. The information regarding the red car can be stored separately. Thus, the red car has disappeared from one scene but could be pasted into another scene.

Where there is no record of part of the background, perhaps because it has been obscured throughout the scene, then that part could be filled in with copied or interpolated background. On method is to interpolate spatially across the missing area, using systems varying from bilinear interpolation to cubic B spline interpolation. A second method is to fill in the area with a low frequency area copy. This would involve selecting a neighbouring area and copying it to the missing region. A low pass filtering function would then be performed on the adjacent data to remove disturbing discontinuities.

Using a digital video effects (DVE) system embedded within the system, it possible to carry out other effects. For example a removed object could be enlarged and placed back in the scene, or reduced and put back in the scene with background being added as necessary.

It would also be possible to change the time at which objects enter or leave a scene. Thus a car which enters a scene slightly too late can be made to enter earlier. Normally this would involve bringing forward the departure time. However, by interpolation techniques the car could be present until the original departure point, i.e it could be made present for a longer time sequence than previously. This might result in unrealistic motion for major changes, but for the likely small adjustments to be made there should be no problems. Adjustments to the soundtrack would be made using existing audio editing technology such as the LEXI-CON system.

Where the camera is not fixed but is for example carrying out a slow pan across the picture, then motion vector techniques could be applied to isolate the motion of the camera. This can be done before attempting to deal with an object such as a car or performer.

The system of removing an object or layer can be used repeatedly. Thus if a performer behind a lamppost and should be in front of it, the lamppost can be cut out, the performer cut out, the lamppost put back and then the performer put back. There will be some missing pixels for the performer, where the lamppost was originally, but these can be filled in using interpolation techniques.

It is important to appreciate that having identified the object to be modified, in a key frame, the operator only has to specify what is to be done in that frame and it will be put into effect automatically for a number of appropriate subsequent frames. It is not necessary to edit each frame individually.

A further use of the system is to take an object which has been shot against one background, and then superimpose it on another background or in another environment entirely, if desired in combination with other effects such as zooming rotating and so forth. Currently, this is frequently done by shooting an object such as a performer against a chose special coloured background which is generally dark blue but could be orange or green. Such systems have been developed by Petro Vlahos of the Ultimatte Corporation. They have a number of drawbacks, including lack of realism and coloured shadows around the images. It is necessary to know in advance that a background change will be made, and to ensure that effects such as wind and lighting are used which will match the eventual background.

In another video processing system for use in the system there is provided a method of processing a video image obtained by scanning photographic film frames, in which each frame on the film is scanned a plurality of times to produce a plurality of constituent frames each containing only part of the data required to represent the image at a relatively high resolution, the constituent frames associated with each film frame are assembled to provide a relatively high resolution video image, and the high resolution images are stored and/or displayed; wherein information is stored indicating the relationship between each constituent frame and its associated high resolution image, a processing decision is made, and processing is carried out on one or more of the constituent frames associated with that high resolution image.

The processing decision could be made on a high definition monitor, on the basis of the high resolution image. However, it would be possible to scan the film an additional time—normally before the multiple scans referred to above—to produce a standard resolution frame which is displayed on a lower definition monitor. The decisions would then be made, following which the above procedure would be carried out to produce the high resolution image. During this period an operator need not be in attendance as the decisions have already been made in real time using the standard definition scan and monitor. An advantage of this route is that it is not necessary to have a high definition monitor, thus reducing costs.

A significant advantage of such a system is that it is not necessary to use an expensive high resolution colour corrector or other processor.

The constituent frames may be obtained by dividing the film frame image into a plurality of sections and scanning each section. Each frame will contain the full number of pixels required to produce a high resolution image of its section, but that number will of course be a fraction of the total number of pixels required to form the complete high resolution image, depending upon the number of sections which typically may be four. A typical arrangement would be to divide the picture into top left, top right, bottom left and bottom right.

Alternatively, the constituent frames may be obtained by scanning across the entire image but in an interleaved fashion. Thus one scan may take in odd lines and odd pixels; the next odd lines and even pixels; the next even lines and odd pixels; and the final scan even lines and even pixels.

The principal use for the system described above is in the field of high definition broadcast pictures having e.g. 1250, 1125 or 1050 lines as mentioned above. Thus a typical high resolution image will be 1800×1125 pixels as opposed to a "standard" resolution of 700×500 pixels. However, another use is in the field of processing "film resolution" images. These may have 4000×3000 pixels, and instead of the relationship of say 4 or 5 constituent frames there may be about 36 (6×6) constituent frames to one film quality frame.

A system as above described is disclosed in UK patent applixcation 9320412.1 and a US application claiming priority therefrom. An outline of the system is shown in FIG. 17. The underlying processor will be as described with reference to FIG. 1 but the subsampler 3a and interpolator 5a would be omitted.

It is often desired to track objects as they move between frames. To deal with this in combination with the above described arrangement it will be necessary to have an extension to the addressing logic in the frame correlator. In real terms, the car will move from the top left of one high definition picture to the top right of the next. However, if the image is divided into four quarters, for example, the correlator will have to find the constituent frame for the top left quarter in one frame and the top right in the next.

Although the present inventions have been described in relation to particular embodiments thereof, many other variations and modifications and other uses will become apparent to those skilled in the art.

I claim:

1. A method of digitally processing a sequence of video frames, the sequence of video frames including a representation of an object which appears in said sequence of frames and undergoes at least one of relative motion and transformation, the object being represented in each of said frames by a plurality of pixels, said method comprising the steps of:

selecting said object in a first frame under the control of an operator;

locating, and tagging the pixels defining said object in said first frame by means of information including at least one of a colour attribute and an appearance attribute;

automatically locating corresponding pixels defining said object in subsequent frames of said sequence by means of said information including at least one of a colour attribute and an appearance attribute and by means of information indicating at least one of an expected position and an expected shape of said object in said subsequent frames; and processing only the pixels defining said object in each of said frames and passing the unselected pixels outside the object without any processing.

2. The method of claim 1, wherein the step of selecting said object in said first frame comprises the steps of:

marking a plurality of points around said object;

defining vectors joining said points so as to define a boundary around said object;

carrying out a scanning operation so as to identify pixels within said boundary; and storing the locations of pixels identified by said scanning operation.

3. The method of claim 1 wherein said information indicating the expected position of said object is obtained by marking said object in two spaced apart frames of said sequence and interpolating to establish the expected position of said object in frames intermediate said two spaced apart frame.

4. The method of claim 1, 2 or 3 wherein the processing step comprises colour correction.

5. The method of claim 1, 2 or 3 wherein the processing step comprises spatial manipulation of said object.

6. A method of digitally processing a sequence of video frames, each of said frames comprising a plurality of digital pixels, a number of which define an object that undergoes at least one of relative motion and transformation in the course of said sequence, the method comprising the steps of:

receiving an input from an operator, said input indicating a region of a first flame containing said object;

locating and tagging, by means of information including at least one of a colour attribute and an appearance attribute of said pixels, those pixels within said region that define said object;

automatically locating corresponding pixels defining said object in subsequent frames of said sequence by means of said information including at least one of a colour attribute and an appearance attribute and by means of information indicating at least one of an expected position and an expected shape of said object in said subsequent flames; and processing only said pixels defining said object in each of said frames and passing the unselected pixels outside the object without any processing.

\* \* \* \* \*